(12) United States Patent
Honma et al.

(10) Patent No.: US 7,912,614 B2
(45) Date of Patent: Mar. 22, 2011

(54) AUTOMATIC TRANSMISSION CONTROL APPARATUS

(75) Inventors: Tomoaki Honma, Isehara (JP); Masaaki Uchida, Yokosuka (JP); Shusaku Katakura, Fujisawa (JP); Yoshinobu Kawamoto, Atsugi (JP); Sadamu Fujiwara, Atsugi (JP)

(73) Assignee: Jatco Ltd, Fuji-shi (JP)

( * ) Notice: Subject to any disclaimer, the term of this patent is extended or adjusted under 35 U.S.C. 154(b) by 832 days.

(21) Appl. No.: 11/870,070

(22) Filed: Oct. 10, 2007

(65) Prior Publication Data
US 2008/0096721 A1   Apr. 24, 2008

(30) Foreign Application Priority Data

Oct. 24, 2006   (JP) ................................ 2006-288783

(51) Int. Cl.
G06F 19/00   (2006.01)
(52) U.S. Cl. ................ 701/51; 701/64; 477/34
(58) Field of Classification Search .............. 701/51, 701/64; 477/34, 86, 107; 475/125
See application file for complete search history.

(56) References Cited

U.S. PATENT DOCUMENTS

| 5,211,079 A | * | 5/1993 | Runde et al. ............... 477/61 |
| 5,782,711 A | | 7/1998 | Tsutsui et al. |
| 5,890,392 A | * | 4/1999 | Ludanek et al. ............ 74/331 |
| 7,500,932 B2 | * | 3/2009 | Katakura et al. .......... 475/123 |
| 2004/0038776 A1 | | 2/2004 | Kuhstrebe et al. |

FOREIGN PATENT DOCUMENTS

| EP | 1450074 A2 | 8/2004 |
| JP | 09-170654 | 6/1997 |
| JP | 10-089456 | 4/1998 |
| JP | 2000-110929 | 4/2000 |

* cited by examiner

*Primary Examiner* — Yonel Beaulieu
(74) *Attorney, Agent, or Firm* — Global IP Counselors, LLP

(57) ABSTRACT

An automatic transmission control apparatus is provided with a control scheme that focuses on the rotational speed differences of the frictional engaging elements and the distribution of torque transferred by the frictional engaging elements. When the automatic transmission is upshifted while in a power-off state, the individual torque capacity of a frictional engaging element being released and the individual torque capacity of a frictional engaging element being connected are corrected by adding a prescribed torque capacity amount to each of the individual torque capacities during an inertia phase of the shift control in which a compensation is executed for inertia related to changing the gear ratio. In this way, frictional losses are induced in the frictional engaging elements so as to absorb the inertia torque and lower the input rotational speed more quickly.

25 Claims, 14 Drawing Sheets

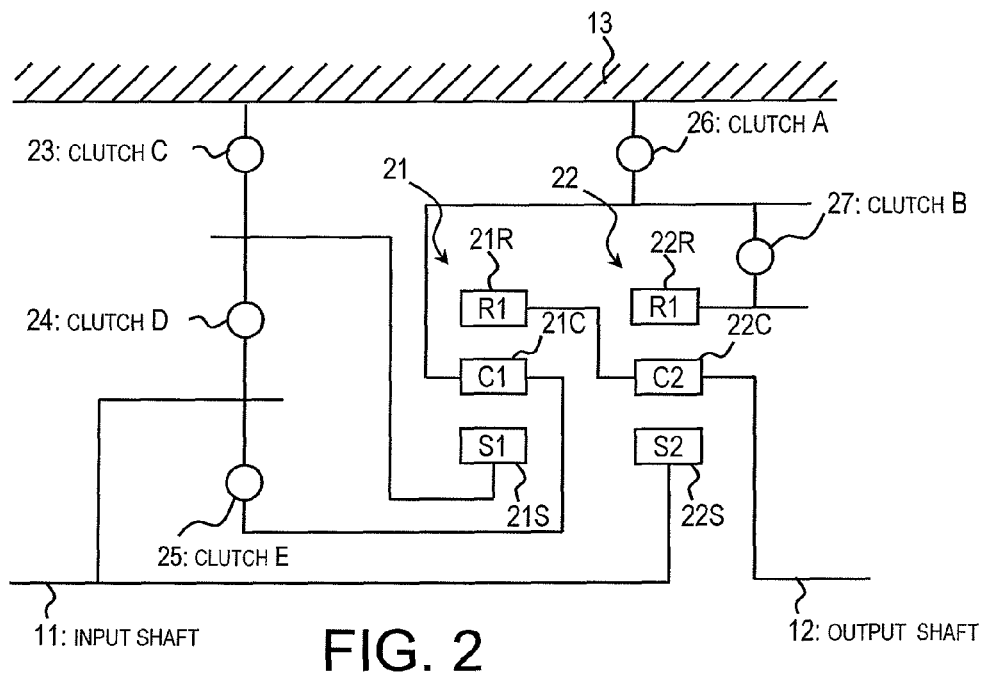
FIG. 2
FIG. 3
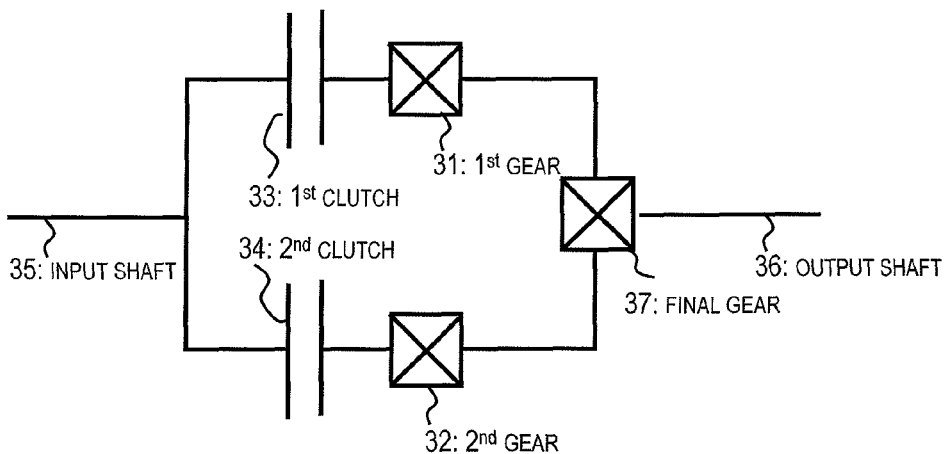
FIG. 4

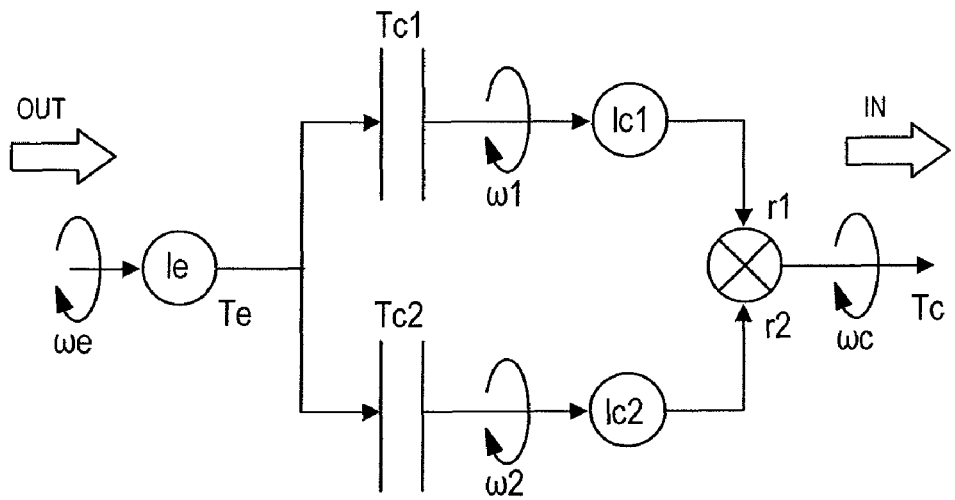

- BASIC EQUATIONS
  (1) INPUT SHAFT EQUATION
  $T_e = T_{c1} + T_{c2} = I_e \dot{\omega}_e$ (2) OUTPUT SHAFT EQUATION
  $T_0 = r_1(T_{c1} - I_{c1}\dot{\omega}_1) + r_2(T_{c2} - I_{c2}\dot{\omega}_2)$

- ASSUMED CONDITIONS
  (3) CONDITIONS REGARDING STATE BEFORE SHIFTING
  $C_{10} = |T_e|$
  $C_{20} = 0$ (4) CONDITIONS REGARDING STATE DURING SHIFTING
  $C_1 = C_{10} + \Delta C_1$
  $C_2 = C_{20} + \Delta C_2$ (5) CONDITIONS REGARDING STATE AFTER SHIFTING
  $T_{C1} = C_1 \times \sin(\omega_e - \omega_1) = C_1$
  $T_{C2} = C_2 \times \sin(\omega_e - \omega_2) = C_2$

FIG. 16

AUTOMATIC TRANSMISSION CONTROL APPARATUS

CROSS-REFERENCE TO RELATED APPLICATIONS

This application claims priority to Japanese Patent Application No. 2006-288783, filed on Oct. 24, 2006. The entire disclosure of Japanese Patent Application No. 2006-288783 is hereby incorporated herein by reference.

BACKGROUND OF THE INVENTION

1. Field of the Invention

The present invention generally relates to an automatic transmission control apparatus and method of controlling the automatic transmission. More specifically, the present invention relates to an automatic transmission control apparatus with a plurality of frictional engaging elements that are selectively engaged to achieve a gear, and configured to accomplish upshifting of the automatic transmission when the vehicle is in a power-off running state by interchanging between engagement of a first frictional engaging element serving to achieve a low gear position before shifting and engagement of a second frictional engaging element serving to achieve a high gear position after shifting.

2. Background Information

When an automatic transmission shifts gears (changes gear ratios), a clutch or other frictional engaging element is typically changed from a released state to an engaged state or from an engaged state to a released state. It is preferable to operate the frictional engaging element smoothly and quickly such that shock does not occur due to shifting gears. Various technologies have been developed for this purpose. Examples of such automatic transmissions are disclosed in U.S. Pat. No. 5,782,711 (also published as Japanese Laid-Open Patent Publication No. 09-17065) and Japanese Laid-Open Patent Publication No. 2000-110929.

The technology disclosed in U.S. Pat. No. 5,782,711 is a technology for reducing the shock associated with shifting gears by controlling a hydraulic pressure supplied to a hydraulic servo mechanism of a frictional engaging element. As shown in FIG. 3 of U.S. Pat. No. 5,782,711, a frictional engaging element is changed from a released state to an engaged state (such a frictional engaging element operation is called "engaging frictional engaging element" or "closing frictional engaging element"), a target hydraulic pressure $P_{T4}$ is calculated for starting an inertia phase based on an input torque, and a prescribed slope (rate of change) is calculated based on the target hydraulic pressure $P_{T4}$ and a preset amount of time $t_{T4}$. The hydraulic pressure is then increased in a first upward sweep based on the calculated slope. At a point in time when the hydraulic pressure reaches the target hydraulic pressure $P_{T4}$, a smaller slope $\delta P_{T4}$ is set based on a target rotational speed change rate corresponding to when an input rotational speed undergoes a prescribed amount of change. The hydraulic pressure is then increased in a second upward sweep based on the slope $\delta P_{T4}$. When the rotational speed change amount $\Delta N$ of the input rotation reaches a rotational speed $dN_S$ corresponding to an amount of change in the rotational speed that can be detected by an input shaft rotational speed sensor so as to determine that the rotational speed has started to change, the hydraulic pressure then begins being feedback controlled so as to change at a prescribed slope while the change in the input rotational speed is monitored. Additionally, the target hydraulic pressure $P_{T4}$, the slope $\delta P_{T4}$ of the second upward sweep portion, and the target shift start time $t_{aim}$ of the second upward sweep portion are corrected with a learning compensation control based on measurements of a target shift start time and the rotational speed change rate at the target shift start time.

The technology disclosed in Japanese Laid-Open Patent Publication No. 2000-110929 checks the change in a transmission input torque frequently during shifting of a transmission that is shifted by changing which of a plurality of frictional engaging elements is engaged. By changing the hydraulic pressure (operating fluid pressure) of a closing frictional engaging element and/or an opening (releasing) frictional engaging element to a value corresponding to a post-shift torque (torque obtained after shifting) frequently in response to changes in the input torque of the transmission during shifting, the torque capacity of the frictional engaging element can be prevented from being excessive or insufficient with respect to the changing transmission input torque. As a result, such undesirable occurrences as revving (racing) of the engine, slow shifting, and large torque lapses can be prevented. As shown in FIG. 7 of Japanese Laid-Open Patent Publication No. 2000-110929, a closing hydraulic pressure command value $P_C$ increases, and an opening hydraulic pressure command value $P_O$ decreases in order to accomplish upshifting by interchanging the connection states of the frictional engaging elements. During this upshifting, if the transmission input torque Ti changes at a time t2, an initial decreased pressure $P_{O1}$ of the command value $P_O$ is changed to a value corresponding to the changed input torque Ti such that the slope at which the command value $P_O$ decreases is changed after the time t2. If the input torque Ti becomes equal to or larger than a prescribed value at a time $t_5$, then a corresponding torque phase ramp slope $\theta_5$ of the command value $P_C$ is calculated and the slope at which the command value $P_C$ increases is changed from the normal value $\theta_1$ to a steeper value $\theta_5$. If the input torque Ti changes at a time $t_7$, then the torque phase ramp slope $\theta_3$ of the command value PC is changed to a slope corresponding to the changed input torque Ti. If the input torque Ti changes at a time $t_{10}$, then the temporarily constant pressure value $P_{C1}$ of the command value $P_C$ and the temporarily constant pressure value $P_{O1}$ of the command value $P_O$ are changed to values corresponding to the changed input torque Ti.

One type of upshift operation is a power-off upshift in which occurs when a vehicle is moving due to inertia after a driver has accelerated by depressing an accelerator pedal and then released the accelerator pedal. An example of this type of power-off upshifting is disclosed in U.S. Pat. No. 5,890,392 (also published as Japanese Laid-Open Patent Publication No. 10-89456). In particular U.S. Pat. No. 5,890,392 discloses a twin-clutch transmission having two transmission input shafts, one transmission output shaft, and two frictional clutches. One of the frictional clutches is provided on each of the transmission input shafts. When a vehicle in which the twin-clutch transmission is installed accelerates from a stop, one of the two clutches is put into a static frictional state from which it transmits engine torque and the other of the two clutches is released.

In U.S. Pat. No. 5,890,392, a case is illustrated in which a higher gear range is selected while a clutch corresponding to a lower gear range is connected and a clutch corresponding to a higher gear range is still in a released state (see FIG. 3 of U.S. Pat. No. 5,890,392—a time chart for explaining the power-off upshift control). The vehicle is traveling in a power-off state, i.e., an inertia state, and, thus, engine is delivering a negative torque. In other words, the engine is operating in an engine braking state. The contact pressure and/or the stroke of the clutch of the low gear range decreases until the clutch enters a slipping state in which the clutch slips slightly. While the clutch of the low gear range is in this slipping frictional state, it still continues to transmit all of the engine torque.

During inertia travel, it can be estimated that the engine is running in an inertia state because the rotational speed of the engine will be lower than the input shaft rotational speed of the lower gear range. The clutch of the lower gear range is controlled first and is controlled such that it is released. When the clutch of the lower gear range is released, the engine changes from a state in which it is delivering negative torque, i.e., is having torque delivered thereto, to a state in which torque is not delivered and, thus, the engine speed declines. Meanwhile, a slip controller of the clutch of the lower gear range operates and adjusts the engine speed to a rotational speed (target rotational speed) just below the rotational speed of the higher gear range.

The slip controller then controls the clutch of the lower gear range such that the engine speed is held just below the rotational speed of the higher gear range while the clutch of the higher gear range is closed in a ramp-like manner (along a sloped path, i.e., a state rate of change). As a result, the slip controller of the lower gear range is released more and more. When the clutch of the lower gear range is completely released, the lower gear range can be disengaged. The clutch of the higher gear range is closed in a ramp-like fashion until it enters a static frictional state. In this way, the power-off upshift is accomplished.

In view of the above, it will be apparent to those skilled in the art from this disclosure that there exists a need for an improved automatic transmission control apparatus. This invention addresses this need in the art as well as other needs, which will become apparent to those skilled in the art from this disclosure.

SUMMARY OF THE INVENTION

It has been discovered that in the case of an automatic transmission such as disclosed by the above mentioned Japanese publication, With respect to an engaging frictional engaging element, the technology disclosed in U.S. Pat. No. 5,782,711 calculates a target hydraulic pressure $P_{TA}$ for starting the inertia phase based on the input torque but, thereafter, the engaging frictional engaging element is controlled by focusing on the hydraulic pressure. Similarly, regarding an opening frictional engaging element that is being changed from an engaged state to a released state, a torque and a hydraulic pressure of the opening frictional engaging element are calculated based on the hydraulic pressure and input torque of the engaging frictional engaging element, but, thereafter, the opening frictional engaging element is controlled by focusing on the hydraulic pressure. Thus, since both the engaging frictional engaging element and the opening frictional engaging element are controlled by focusing on the hydraulic pressure, it is necessary to employ a special calculation equation that takes into account the characteristics of both frictional engaging elements in order to control both frictional engaging elements simultaneously.

Regarding interchanging the connection states of two frictional engaging elements of an automatic transmission during shifting, it is feasible that smoother and more stable shift control that does not incur shock can be accomplished by executed control that focuses on the rotational speed difference of each of the frictional engaging elements and the distribution of torque transmitted by both frictional engaging elements during both the inertia phase and the engagement transition and release transition of the frictional engaging elements. However, with the technology disclosed in U.S. Pat. No. 5,782,711, it is difficult to ascertain the relationship between the control results of engaging frictional engaging element and the releasing frictional engaging element and, thus, it is difficult to adopt a control that focuses on the rotational speed differences and transmitted torque distributions of the frictional engaging elements.

With the technology disclosed in Japanese Laid-Open Patent Publication No. 2000-110929, the total torque transfer capacity of both frictional engaging elements and the amount of torque distributed to each of the frictional engaging elements at any given point in time are obscure because the two frictional engaging elements are controlled with separate logic schemes. Consequently, rotational speed difference control of each of the frictional engaging elements and torque distribution ratio control of both frictional engaging elements cannot be adjusted separately and a great amount of research will be required in order to execute a frictional engaging element interchange control that focuses on the rotational speed difference of each of the frictional engaging elements and the transmitted torque distribution of both frictional engaging elements.

Focusing on power-off upshifting, the control disclosed in U.S. Pat. No. 5,890,392 is configured to accomplish shifting by withdrawing the capacity of the clutch that is being released. Consequently, the shift operation is accomplished almost entirely by the natural decline of the input shaft rotational speed. As a result, shifting cannot be accomplished faster than the change that results from the natural decline of the input shaft rotational speed. In other words, the rate at which the input shaft rotational speed changes is not controlled in an aggressive manner. Additionally, by withdrawing the capacity of the clutch that is transmitting power, the engine braking force is also withdrawn.

If an attempt were made to manage the rate of change of the input shaft rotational speed using the control disclosed in U.S. Pat. No. 5,890,392 while maintaining the engine braking force, then it would not be possible to execute the torque reduction control required when, for example, a power-on upshift is executed because the control disclosed in U.S. Pat. No. 5,890,392 focuses on power-off upshifting, i.e., upshifting when the engine torque is less than zero. Thus, the capacity of the clutch being released must be withdrawn and the problem described above cannot be solved.

The present invention was conceived in view of the issues described above. In view of the above-mentioned issues, one object is to provide an automatic transmission control apparatus and method that can accomplish frictional engaging element interchange control in a simple manner, particularly when the automatic transmission is upshifting while in a power-off state. Furthermore, another object is to provide an automatic transmission control apparatus and method that can be readily applied to a variety of automatic transmissions so as to execute smooth and stable shift control with little shock.

In order to achieve the aforementioned objects, an automatic transmission control apparatus is provided for an automatic transmission that basically comprises a target value setting section, a total torque capacity calculating section, a distribution ratio setting section, an individual torque capacity calculating section and a connection control section. The target value setting section sets a target rotational speed value for at least one of a first frictional engaging element that is engaged for achieving a low speed gear range before execution of a power-off upshifting and a second frictional engaging element that is engaged for achieving a high speed gear range after the power-off upshifting when the automatic transmission is executing the power-off upshifting, and that sets the target rotational speed value for the first frictional engaging element when in a non-shifting, power-off state before the power-off upshifting is executed. The total torque capacity calculating section is configured to calculate a total torque capacity required of the first and second frictional engaging elements to obtain the target rotational speed value set by the target value setting section. The distribution ratio setting section set a distribution ratio for distributing portions of the total torque capacity between the first and second frictional engaging elements when the automatic transmission is executing the power-off upshifting. The individual torque capacity calculating section is configured to calculate an individual torque capacity for each of the first and second frictional engaging elements based on the total torque capacity calculated by the total torque capacity calculating section and the distribution ratio set by the distribution ratio setting section. The individual torque capacity calculating section executes additively correction of the individual torque capacities of the first and second frictional engaging elements by adding a prescribed torque capacity amount to each of the individual torque capacities when the automatic transmission is in an inertia phase in which a compensation is executed for inertia related to changing from a pre-shift gear ratio to a post-shift gear ratio. The connection control section controls a connection state of each of the first and second frictional engaging elements in accordance with the individual torque capacities calculated by the individual torque capacity calculating section when the power-off upshifting is executed to shift from a pre-shift gear ratio to a post-shift gear ratio.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 2 is a skeleton diagram showing the basic parts of one example of an automatic transmission that can be operated by an automatic transmission shift control in accordance with the present invention is applied;

FIG. 3 is a table showing the connection states of the clutches of the automatic transmission shown in FIG. 2 during upshifting from first speed gear to second speed gear;

FIG. 4 is a simplified skeleton diagram showing the basic parts of another example of an automatic transmission that can be operated by an automatic transmission shift control in accordance with the illustrated embodiments;

FIG. 16 is a skeleton diagram for explaining the variables used to verify the technology of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Before specifically describing the illustrated embodiments, the operating principles and basic constituent features of the automatic transmission shift control that are common to all of the embodiments will be explained with reference to FIGS. 1 to 6.

Figure 1:
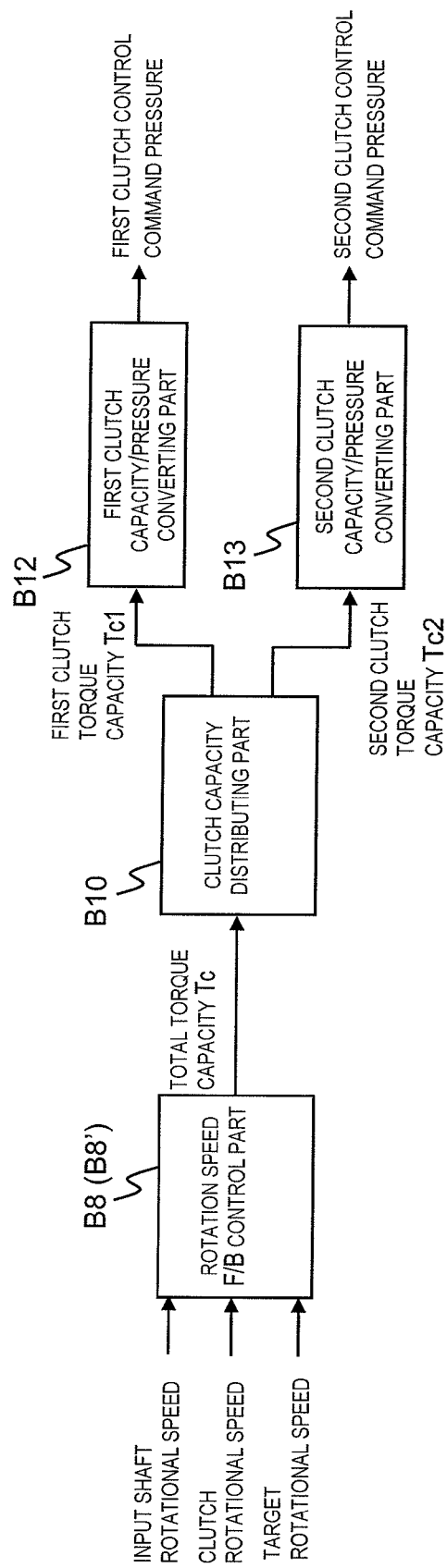
FIG. 1 is a block diagram showing the basic constituent features of a twin-clutch transmission control apparatus in accordance with the illustrated embodiments.

As shown in FIG. 1, a block diagram is illustrated that shows the basic elements of a twin-clutch transmission control apparatus in accordance with the illustrated embodiments. The twin-clutch transmission control apparatus is basically provided with a rotational speed difference feedback (F/B) control part (front-end functional element) B8, a clutch capacity distributing part (rear-end functional element) B9, a first clutch capacity/pressure converting part B12 and a second clutch capacity/pressure converting part B13. The rotational speed difference feedback (F/B) control part B8 performs clutch rotation control (control of the rotational speed of the input side or rotational speed difference), while the clutch capacity distributing part B10 performs clutch distribution ratio control.

FIG. 2 is a skeleton diagram showing the constituent features of a typical four-speed automatic transmission that is controlled by the transmission control apparatus of FIG. 1. As shown in FIG. 2, the automatic transmission is disposed between an input shaft 11 and an output shaft 12 with two planetary gear sets 21 and 22 arranged in series between the input shaft 11 and the output shaft 12. The first planetary gear set 21 basically includes a sun gear (S1) 21S, a carrier (C1) 21C and a ring gear (R1) 21R. The second planetary gear set 22 basically includes a sun gear (S2) 22S, a carrier (C2) 22C and a ring gear (R2) 22R.

A brake (clutch C) 23 is disposed between the sun gear 21S and a casing 13. The brake (clutch C) 23 and the sun gear 21S serve as a frictional engaging element (hereinafter called a "clutch"). When the brake 23 is engaged (also referred to as "connected"), the rotation of the sun gear 21S is stopped. A clutch (clutch D) 24 serving as a frictional engaging element is disposed between the input shaft 11 and the sun gear 21S. When the second clutch 24 is engaged, the sun gear 21S rotates as an integral unit with the input shaft 11. In the explanation that follows, all frictional engaging elements (i.e., clutches and brakes) will be referred to simply as a clutches.

The carrier (C1) 21C of the first planetary gear set 21 supports a planetary pinion. A clutch (clutch E) 25 is disposed between the carrier 21C and the input shaft 11. When the second clutch 25 is engaged, the carrier 21C rotates as an integral unit with the input shaft 11. A brake (clutch A) 26 is disposed between the carrier 21C and the casing 13. When the brake 26 is engaged, rotation of the carrier 21C is stopped. The second planetary gear set 22 has a clutch (clutch B) 27 that is disposed between the ring gear 22R and the carrier 21C. When the second clutch 27 is engaged, the carrier 21C and the ring gear 22R of the second planetary gear set 22 rotate together as an integral unit.

The ring gear (R1) 21R of the first planetary gear set 21 is connected directly to the carrier (C2) 22C that supports a planetary pinion of the second planetary gear set 22.

The sun gear (S2) 22S of the second planetary gear set 22 is connected directly to the input shaft 11. The carrier 22C supports a planetary pinion of the second planetary gear set 22 and is connected directly to the ring gear 21R of the first planetary gear set 21 and to the output shaft 12. The ring gear 22R of the second planetary gear set 22 is connected to the carrier 21C of the first planetary gear set 21 through the second clutch 27, as mentioned previously.

As indicated in the clutch connection table of FIG. 3, when this kind of automatic transmission upshifts from a first speed gear (first gear range) to a second speed gear (second gear range), the clutch A is changed from a connected state to a released state and the clutch C is changed from a released state to a connected state. The other clutches B, D and E remain in the same state they were in before the upshift. In other words, the connected clutch A is released and the released clutch C is connected in order to upshift from the first speed gear to the second speed gear.

In order to simplify the interchange (switching) of the connection states of the clutches, consider an automatic transmission whose structure has been simplified as much as possible by having two gears with two different gear ratios each of which is connected to one of two parallel shafts through a clutch, as shown in FIG. 4. More specifically, a clutch 33 is connected in series with a gear train 31 having a certain gear ratio (e.g., first speed gear and a clutch 34 connected in series with a gear train 32 having another gear ratio (e.g., second speed gear). The clutch 33 and the gear train 31 are arranged in parallel with the clutch 34 and gear train 32. One engaging element of each of the clutches 33 and 34 is connected to an input shaft 35 and the other engaging element of each of the clutches 33 and 34 is connected to an output shaft 36 through the respective gear train 31 or 32 and a final gear 37.

Figure 5:
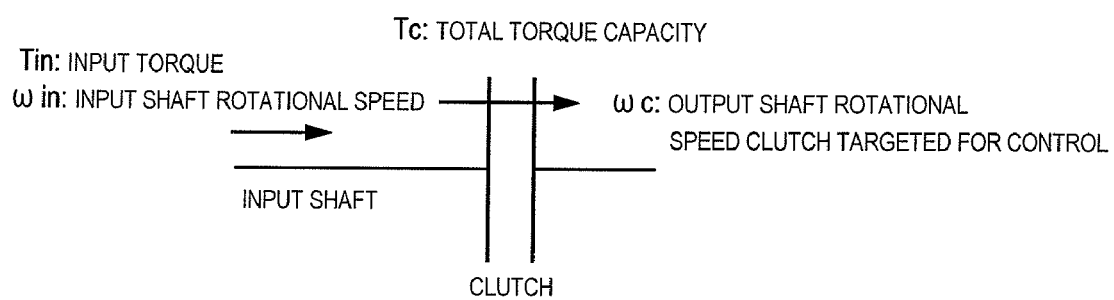
FIG. 5 is a further simplified skeleton diagram the basic parts of another example of an automatic transmission that can be operated by an automatic transmission shift control in accordance with the illustrated embodiments.

When the two-speed transmission shown in FIG. 4 upshifts from the first speed gear to the second speed gear, a shift control is executed such that the clutch 33 (which is currently connected) is released, while the clutch 34 (which is currently released) is connected. Now consider the interchange of the clutches 33 and 34 from the perspective of rotational speed difference control of the clutches 33 and 34. The torque capacities Tc1 and Tc2 of the two clutches 33 and 34 are controlled with respect to an input torque Tin and an input rotational speed (in such that the rotational speed of one of the clutches 33 and 34 is controlled. Thus, looking only at the clutch portion of the two-speed transmission, one can think of the capacities of the two clutches 33 and 34 as being controlled by executing rotational speed difference control of a single combined clutch, as shown in FIG. 5, instead of separately controlling the individual capacity of each of the two clutches 33 and 34.

Now, consider a case in which a twin-clutch transmission control apparatus in accordance with the embodiments described hereafter is used to change a first clutch from a connected state to a released state and a second clutch from a released state to a connected state. As shown in FIG. 1, the rotational speed difference feedback control part B8 is used for controlling of the rotational speed of the input side or rotational speed difference and the clutch capacity distributing part B10 is used for controlling a distribution ratio between the first clutch and the second clutch. In this control scheme, a clutch interchange control for switching which clutch transmits torque is executed while executing a rotational speed difference control such that the input shaft rotational speed of the transmission or the input/output rotational speed difference of the first clutch being released is held within a prescribed range. The rotational speed difference control involves controlling the total torque capacity of the first clutch being released and the second clutch being connected and adjusting the distribution ratio at which the total torque capacity is distributed to the two first and second clutches. Ultimately, the torque transfer capacity of the first clutch being released is converted into a control pressure by the first clutch capacity/pressure converting part B12 and the torque transfer capacity of the second clutch being connected (engaged) is converted into a control pressure by the second clutch capacity/pressure converting part B13. The control pressures serve as control commands.

By designing the control scheme in this way, the rotational speed difference control of the first and second clutches and the distribution ratio control of the first and second clutches can be thought of separately but, ultimately, these two controls are combined so as to produce a single control quantity on which to base the control of each of the first and second clutches. As a result, the control scheme can be readily applied to the shift control of a variety of automatic transmissions.

One of the various shift situations that can be handled with this kind of control scheme is a situation in which the transmission shifts to a higher speed gear (upshifts) while the vehicle is in a state in which the driver has released the accelerator pedal. Since the engine output is negative (i.e., in a power-off state), this kind of upshift is called a power-off upshift.

When the vehicle goes into a power-off state, the accelerator position (throttle opening) decreases and the engine output declines. Consequently, the engine speed (i.e., the rotational speed of the input shaft 11) decreases in conjunction with the release of the first clutch that is in a connected state before the shift operation, i.e., the first clutch being released. Meanwhile, when the transmission upshifts, the change of gear ratios causes the engine speed (i.e., the rotational speed of the input shaft 11) to decrease. Thus, when a power-off upshift occurs, the natural change in the rotational speed of the input shaft (input member) 11 of the transmission that accompanies the release of the first clutch and the change in the rotational speed of the first clutch that results from the shift control are both oriented in the same direction.

Under such conditions, first the rotational speed of the input shaft 11 is changed from a rotational speed substantially equal to that obtained with the gear ratio of the gear range in effect before shifting to a rotational speed substantially equal to the rotational speed that will be obtained with the gear ratio of the gear to be obtained after shifting. Then, the connection states of the clutches are interchanged.

Figure 6:
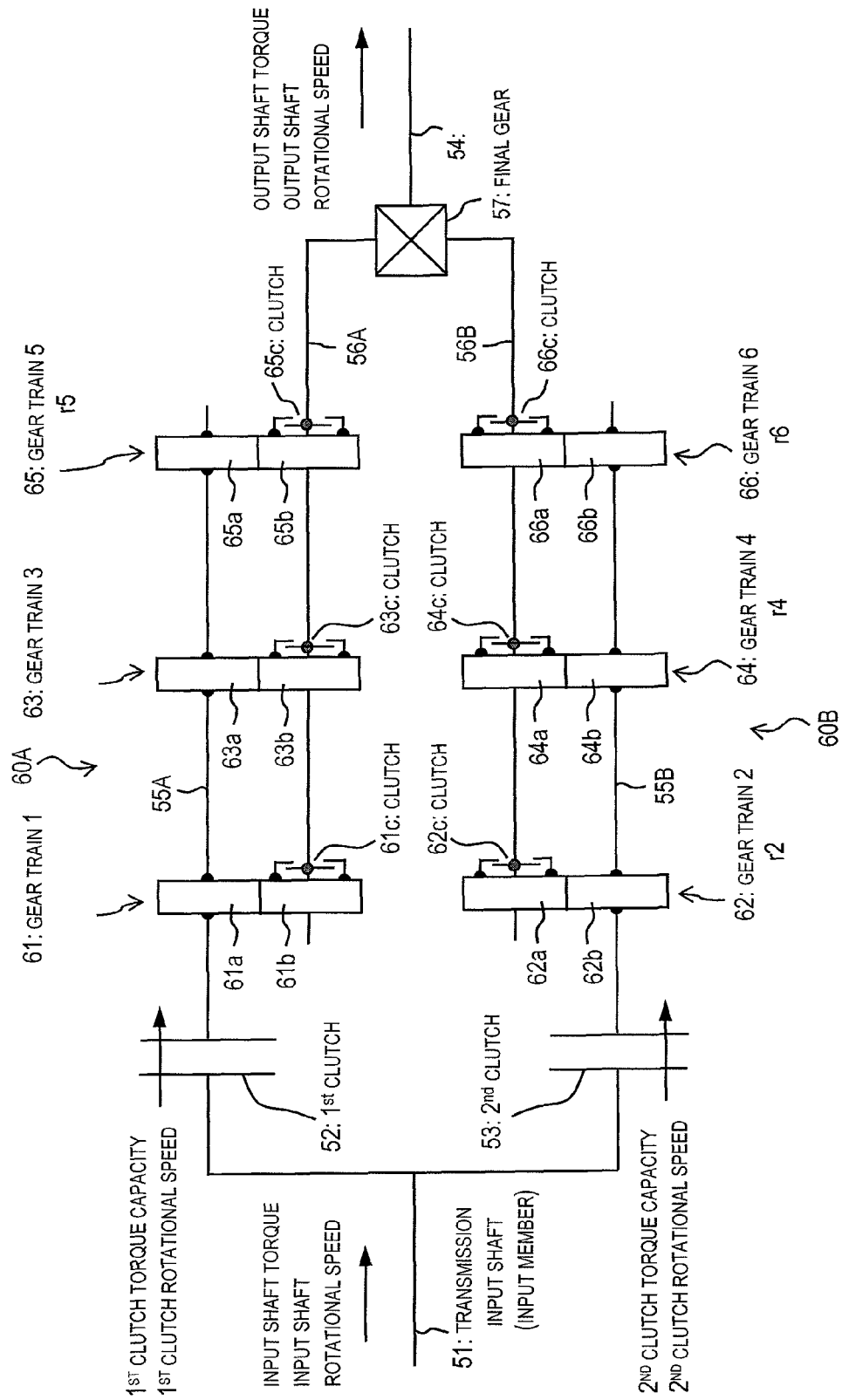
FIG. 6 is a skeleton diagram showing the basic parts of another example of an automatic transmission that can be operated by an automatic transmission shift control in accordance with the illustrated embodiments.

The two-speed transmission shown in FIG. 4 can be expanded into the dual-shaft six-speed automatic transmission shown in FIG. 6. The embodiments described hereinafter will be explained under the assumption of this kind of dual-shaft six-speed automatic transmission.

As shown in FIG. 6, the automatic transmission has an input shaft (input member) 51, a first clutch 52 and a second clutch 53 connected to an input-side member, an output shaft 54, a transmission gear mechanism 60A disposed between the first clutch 52 and the output shaft 54, and a transmission gear mechanism 60B disposed between the second clutch 53 and the output shaft 54.

The transmission gear mechanism 60A has an input-side shaft (input shaft 1) 55A, an output-side shaft (output shaft 1) 56A, a first speed gear set (gear train 1) 61, a third speed gear set (gear train 3) 63 and a fifth speed gear set (gear train 5) 65. The gear sets 61, 63 and 65 are disposed between the input-side shaft 55A and the output-side shaft 56A. The first speed gear set (gear train 1) 61 includes a pair of gears 61a and 61b and an engaging mechanism (hereinafter called simply a "synchronizer") 61c equipped with a synchronizing mechanism. The third speed gear set (gear train 3) 63 includes a pair of gears 63a and 63b and an engaging mechanism 63c equipped with a synchronizing mechanism. The fifth speed gear set (gear train 5) 65 includes a pair of gears 65a and 65b and an engaging mechanism 65c equipped with a synchronizing mechanism.

The transmission gear mechanism 60B has an input-side shaft (input shaft 1) 55B, an output-side shaft (output shaft 1) 56B, a second speed gear set (gear train 2) 62, a fourth speed gear set (gear train 4) 64 and a sixth speed gear set (gear train 6) 66. The gear sets 62, 64 and 66 are disposed between the input-side shaft 55B and the output-side shaft 56B. The second speed gear set (gear train 2) 62 includes a pair of gears 62a and 62b and an engaging mechanism 62c equipped with a synchronizing mechanism. The fourth speed gear set (gear train 4) 64 includes a pair of gears 64a and 64b and an engaging mechanism 64c equipped with a synchronizing mechanism. The sixth speed gear set (gear train 6) 66 includes a pair of gears 66a and 66b and an engaging mechanism 65c equipped with a synchronizing mechanism.

Each of the gear sets 61 to 66 has a different gear ratio r1 to r6.

A gear 57a is fixed to an output end portion of the output-side shaft 56A and arranged to mesh with a gear 54a of the output shaft 54 such that power can be transmitted from the output-side shaft 56A to the output shaft 54. Similarly, a gear 57b is fixed to an output end portion of the output-side shaft 56B and arranged to mesh with the gear 54a of the output shaft 54 such that power can be transmitted from the output-side shaft 56B to the output shaft 54.

In order to achieve the first speed gear, the third speed gear, or the fifth speed gear, the engaging mechanism 61c, 63c, or 65c corresponding to the transmission gear set to be achieved is engaged, the first clutch 52 is engaged, and the second clutch 53 is released. In order to achieve the second speed gear, the fourth speed gear, or the sixth speed gear, the engaging mechanism 61c, 63c, or 65c corresponding to the transmission gear set to be achieved is engaged, the second clutch 53 is engaged, and the first clutch 52 is released. Thus, for example, when the automatic transmission upshifts from the fifth speed gear to the sixth speed gear, the automatic transmission changes from the state that achieves the fifth speed gear (i.e., a state in which the first clutch 52 is engaged, the second clutch 53 is released, the second clutch 65c of the fifth speed gear set 65 is engaged, and the clutches 61c and 63c of the first and third speed gear sets 61 and 63 are released) to the state that achieves the sixth speed gear (i.e., a state in which the second clutch 53 is engaged, the first clutch 52 is released, the second clutch 66c of the sixth speed gear set 66 is engaged, and the clutches 62c and 64c of the second and fourth speed gear sets 62 and 64 are released).

Therefore, a control can be executed to change the first clutch 52 from an engaged state to a released state and the second clutch 53 from a released state to an engaged state and a control can be executed to change from a state in which among the first, third and fifth speed gear sets 61, 63 and 65 only the second clutch 65c of the fifth speed gear set 65 is engaged to a state in which among the second, fourth and sixth speed gear sets 62, 64 and 66 only the second clutch 66c of the sixth speed gear set 66 is engaged. This control operation is called a mechanical operation other than connection and release of the first and second clutches 52 and 53.

In order to change only one gear position, it is sufficient to execute control that switches the connection states of the first clutch 52 and the second clutch 53. Thus, situations in which upshifting occurs due to release of the accelerator pedal (power-off upshifting) include upshifting from fourth speed gear to fifth speed gear, shifting from third speed gear to fourth speed gear, and shifting from second speed gear to third speed gear.

First Embodiment

Referring now to FIGS. 7 to 11, a twin-clutch transmission control apparatus and a twin-clutch transmission control method in accordance with a first embodiment of the present invention will now be described.

In this embodiment, an upshift control is employed when one of the first clutch 52 and the second clutch 53 is changed from an engaged state to a released state and the other is changed from a released state to an engaged state in response to a request to change a gear ratio of an automatic transmission of the type described above. The following explanation will treat the first clutch 52 as the first clutch being changed from the engaged state to the released state and the second clutch 53 as the second clutch being changed from the released state to the engaged state. However, the same control can be applied when the first clutch 52 is changed from the released state to the engaged state and the second clutch 53 is changed from the engaged state to the released state.

With an automatic transmission shift control apparatus and shift control method of this embodiment, control for interchanging the connection states of frictional engaging elements (the first and second clutches 52 and 53) in order to upshift the transmission when a vehicle is traveling in a power-off state can be accomplished by controlling the rotational speeds of the frictional engaging elements (the first and second clutches 52 and 53) in a manner that focuses on the distribution of torque transmitted by the frictional engaging (the first and second clutches 52 and 53). Thus, while the interchange control is divided into a control focused on the torque and a control focused on the rotational speed, ultimately a single control quantity is delivered and a smooth interchange operation can be achieved with a simple control logic. Additionally, the timing of changing a first frictional engaging element (the first clutch 52) serving to transmit power before shifting from a connected state to a released state and the timing of changing a second frictional engaging element (the second clutch 53) that will serve to transmit power after shifting from a released state to a closed state can be perfectly synchronized. The control method can be applied readily to various automatic transmissions and achieve smoother, more stable shift control without shift-related shock. When the transmission is upshifted while the vehicle is traveling in a power-off state, the torque cannot be reduced and thus torque reduction control cannot be used to lower the input shaft rotational speed. However, during the inertia phase, a prescribed torque capacity amount is added to each of the individual torque capacities of the first and second frictional engaging elements (the first and second clutches 52 and 53) calculated based on the total torque capacity and the distribution ratio in order to correct the individual torque capacities as a compensation for inertia. As a result, the inertia torque related to gear shifting the power transmission system can be canceled out with frictional loss such that the input shaft rotational speed is lowered and the inertia phase (compensation for inertia) is completed more quickly, thereby enabling upshifting during power-off travel to be accomplished in a shorter amount of time. Since the additive correction is accomplished with a prescribed torque capacity amount, smooth and stable shift control can be conducted without the occurrence of shock.

Additionally, by calculating a derivative of the target rotational speed difference, calculating an inertia torque accompanying the input shaft rotational speed change, and using the calculated inertia torque amount as the prescribed torque capacity amount used for the additive correction, smooth and stable shift control can be conducted without the occurrence of shock. By executing the additive correction from the start of the inertia phase (inertia compensation), aggressive lowering of the input shaft rotational speed is started at an early stage and the inertia phase can be completed more quickly. Additionally, the transition to the next phase can be accomplished smoothly by gradually decreasing the prescribed torque used for the additive correction to zero by the end of inertia phase.

The control device in this embodiment basically includes a preparation phase, an inertia phase, an interchange phase and an end phase. FIG. 1 illustrates an interchange phase of the control device in this embodiment. The preparation phase occurs at a stage prior to the interchange phase and serves to prepare for switching (interchanging) the connection states of the clutches 52 and 53. The inertia phase is executed following the preparation phase and serves to adjust an inertial compensation amount. The interchange phase is executed following the inertia phase and serves to change one of the first clutch 52 and the second clutch 53 from an engaged state to a released stage and change the other from a released state to an engaged state. The end phase is executed following the interchange phase and ends the control.

Looking at the control device from this perspective, the control device includes, among other things, a transmission electronic control unit (ECU) 3. The electronic control unit 3 preferably includes a microcomputer with a shift control program that controls the shifting of the automatic transmission as discussed below. The electronic control unit 3 can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the electronic control unit 3 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The transmission electronic control unit (ECU) 3 can be functionally divided into a shift determining section 3A and a specific (power-off) upshift determining section 3B, and a shift (frictional engaging element) control section 10. The shift control section 10 can be functionally divided into a target value setting section 10A, a total torque capacity calculating section 10B, a distribution ratio setting section 10C, an individual torque capacity calculating section 10D, and an connection control section 10E. The shift determining section 3A and the specific shift determining section 3B are configured and arranged for determining if a power-off upshift will occur.

The shift determining section 3A will now be explained. The shift determining section 3A serves to determine whether or not shifting (gear changing) should be executed and to set a target gear ratio when it determines that shifting should be executed. The shift determination is accomplished using a shift map based on such parameters as the vehicle speed and the engine load (e.g., throttle opening degree or accelerator pedal depression amount). If an operating point determined by the vehicle speed and the engine load moves to a position beyond an upshift line, the gear ratio corresponding to the position of the operating point on the map is set as the target gear ratio.

The specific shift determining section 3B serves to determine if an upshift detected by the shift determining section 3A is a power-off upshift (i.e., an upshift that will occur while the vehicle is in a power-off state in which there is not any transfer of torque from the engine to the transmission). A determination as to whether the vehicle is in the power-off state can be accomplished by determining if the accelerator pedal depression amount or the throttle opening degree is below a reference value, determining if a change amount of the accelerator pedal depression amount or the throttle opening degree is below a reference change amount, or by using a combination of these. It is also possible to determine if the power-off state exists by causing a small amount of slippage to occur in a clutch currently transmitting power and determining if the input rotational speed is smaller than the output rotational speed of the clutch.

The shift control section 10 will now be explained. The shift control will be explained based on the assumption of a power-off upshifting from a state in which the first clutch is used (i.e., fifth gear speed or third gear speed) to a state in which the second clutch is used (i.e., sixth gear speed or fourth gear speed). However, the same control can be applied to other power-off upshift situations by substituting the corresponding gears and clutches.

As a target value of the rotation of the clutch targeted for control, the target value setting section 10A sets a target rotational speed difference value indicating a difference between the rotational speeds of the input side and the output side of the clutch targeted for control. The clutch targeted for control changes as the shift control progresses. When the shift control starts, the clutch (first clutch) that is currently being used and that will be released in order to shift gear ratios is the clutch targeted for control. The target value setting section 10A then sets a first target rotational speed difference value $\Delta n1$ (also called "target rotational speed difference value 1") for the input/output rotational speed difference value of the clutch to be released (first clutch). During subsequent stages of the shift control, the clutch (second clutch) that will be connected and used for the target gear ratio (gear ratio to be obtained after shifting) is targeted for control and the target value setting section 10A sets a second target rotational speed difference value Δn2 (also called "target rotational speed difference value 2") for the input/output rotational speed difference of the clutch to be connected (second clutch).

During a power-off upshift, the first and second target rotational speed difference values Δn1 and Δn2 are set to small values such that the input rotational speed of the clutch targeted for control is smaller than the output rotational speed of the same clutch by a prescribed small amount. In other words, the first target rotational speed difference value Δn1 is set such that the input rotational speed of the first clutch (i.e., the rotational speed of the input shaft 51) is smaller than the output rotational speed of the first clutch (i.e., the rotational speed of the input-side shaft (input shaft 1) 55A) by the amount of the first rotational speed difference value Δn1. Meanwhile, the second target rotational speed difference value Δn2 is set such that the input rotational speed of the second clutch (i.e., the rotational speed of the input shaft 51) is smaller than the output rotational speed of the second clutch (i.e., the rotational speed of the input-side shaft (input shaft 2) 55B) by the amount of the second rotational speed difference value Δn2.

When the vehicle is in a power-off state, the engine speed (input rotational speed) will decrease if one of the clutches is connected in a slipping fashion. By controlling the slipping state of the clutch, a state can be achieved in which the input rotational speed of the clutch is smaller than the output rotational speed of the clutch by a small amount that is equal to the target rotational speed difference value Δn (i.e., a state in which the engine speed is lower than the output rotational speed of the clutch).

Additionally, even when the vehicle is traveling normally before it has been determined that shifting will be executed (shift determination), the target value setting section 10A sets a target rotational speed difference value for the clutch that is connected and in use (the clutch that will be in the engaged state immediately before the next shift operation) if the vehicle is traveling in a power-off state. The first target rotational speed difference value Δn1 is used for the target rotational speed difference value in such a situation. In other words, whenever the vehicle is in a power-off state, the currently connected clutch is controlled to slip in accordance with the target rotational speed difference value even if it has not been determined that shifting will be executed. As a result, the processing of a subsequent shift operation can be executed more quickly after the shift operation starts.

The total torque capacity calculating section 10B calculates a total torque transfer capacity based on a parameter value indicating the engine load, e.g., the throttle opening degree or the accelerator pedal position. In this embodiment of the control device, the total torque capacity calculating section 10B calculates the total torque capacity Tc of the clutches by adding the input shaft torque Tin (which is equivalent to an open control amount) to a feedback correction amount (F/B correction amount Tfb) set in accordance with an amount of deviation (feedback control deviation) between an actual rotational speed difference of the clutch targeted for control and a target rotational speed difference used for rotational speed difference feedback control (F/B control) of the clutch targeted for control.

When the engine is generating torque (power-on state), the engine speed (input shaft rotational speed) will rise if the total torque transfer capacity is small with respect to the engine load and the engine speed (input shaft rotational speed) will decrease if the total torque transfer capacity is large with respect to the engine load. Conversely, when the vehicle is engine braking (in the power-off state) such that torque from the drive wheels rotatably drives the engine, the engine speed (input shaft rotational speed) will decrease if the total torque transfer capacity is small with respect to the engine load and the engine speed (input shaft rotational speed) will increase if the total torque transfer capacity is large with respect to the engine load.

The distribution ratio setting section 10C sets the proportions (distribution ratio) at which the total torque transfer capacity will be distributed to the clutch being released and the clutch being connected. The interchange phase will now be explained while focusing on distribution ratio of the clutch being released, i.e. the clutch being changed from a connected (engaged) state to a released state. When the vehicle is traveling normally before shifting and the vehicle is in a power-off state, the clutch that is currently connected (i.e., the clutch that will be released when the transmission upshifts afterwards) is made to slip slightly by setting the distribution ratio of the connected clutch to an amount that is smaller than 1 by a very small amount α(1−α) and the distribution ratio of the clutch that is currently released (i.e., the clutch that will be connected when the transmission upshifts afterwards) is set to the very small amount α. During the preparation phase and the inertia phase of the shift control, the distribution ratio setting section 10C sets the portion of the distribution ratio indicating the portion of the total torque transfer capacity to be distributed to the clutch that will be released to 1 such that all of the total torque transfer capacity is born by the clutch that will be released. In the interchange phase, the distribution ratio setting section 10C sets the distribution ratio such that the portion of the distribution ratio corresponding to the clutch being released is gradually decreased from 1 to 0 and the portion of the distribution ratio corresponding to the clutch being connected is gradually increased from 0 to 1. In the end phase, the distribution ratio setting section 10C sets the portion of the distribution ratio corresponding to the clutch that will be released to 0 (sets the portion of the distribution ratio corresponding to the clutch that will be connected to 1) such that all of the total torque transfer capacity is born by the clutch that will be connected.

The individual torque capacity calculating section 10D sets the torque capacity (individual torque capacity) of each of the clutches, i.e., the clutch to be released and the clutch to be connected, based on the total torque capacity calculated by the total torque capacity calculating section 10B and the distribution ratio set by the distribution ratio setting section 10C, which indicates the portions of the total torque capacity to be distributed to the clutch to be released and the clutch to be connected. In other words, the individual torque capacity of the clutch to be released is obtained by multiplying the total torque capacity by the distribution ratio of the clutch to be released, and the individual torque capacity of the clutch to be connected is obtained by multiplying the total torque capacity by the distribution ratio of the clutch to be connected.

In this embodiment, when the transmission is power-off upshifting (i.e., the vehicle is traveling in a power-off state), the individual torque capacity calculating section 10D additively corrects the individual torque capacities of the first and second frictional engaging elements (clutches) calculated based on the total torque capacity calculated by the total torque capacity calculating section 10B and the distribution ratio set by the distribution ratio setting section 10C. The additive correction is executed during the inertia phase of the upshift control and is accomplished by adding a prescribed torque capacity amount (also called "additive correction torque capacity") to each of the individual torque capacities. The prescribed torque capacity amount is set to as large a value as possible without being excessive in view of the strength and durability of the clutches. More specifically, the individual torque capacity calculating section 10D is configured to calculate a derivative value of the target rotational speed difference value set by the target value setting section 10A, calculate an inertia torque resulting from a change in the input shaft rotational speed by multiplying the derivative value by an input shaft inertia, and set the calculated inertia torque as the additive correction torque capacity.

The additive correction executed in the inertia phase is configured to commence adding the additive correction torque capacity (which is set to as large a value as possible without being excessive in view of the strength and durability of the clutches) from the start of the inertia phase and to gradually decrease the additive correction torque capacity starting from a point in time occurring before the end of the inertia phase such that the additive correction torque capacity reaches 0 by the end of the inertia phase.

The connection control section 10E serves to adjust engagement control quantities of the clutch being released and the clutch being connected based on the torque transfer capacities (individual torque capacities) calculated by the individual torque capacity calculating section 10D. The engagement control quantity of each clutch indicates the hydraulic pressure applied to that particular clutch. The relationship between the individual torque capacity and the hydraulic pressure of a particular clutch can be ascertained in advance with a characteristic relationship (clutch capacity versus hydraulic pressure characteristic) and, thus, the hydraulic pressure of each clutch can be set and controlled based on the individual torque capacity.

When it is determined that shifting will start, the shift control (preparation phase, inertia phase, interchange phase, end phase) starts.

In the preparation phase, the clutch that will be released (first clutch in this embodiment) is put into a slipping state by adjusting the engagement control quantity of the first clutch such that the input/output rotational speed difference of the first clutch (rotational speed difference between the input and output sides of the first clutch) becomes equal to a first target rotational speed difference value $\Delta n1$. Meanwhile, the second clutch that will be connected during the course of the shift operation is in a released state and all of the total torque transfer capacity is born by the first clutch that will be released (i.e., the distribution ratio of the clutch that will be released is 1). Also, in the preparation phase, a mechanical operation other than connecting and releasing first and second clutches is executed in order to establish the targeted gear ratio (i.e., the gear ratio to be obtained after shifting, also called "post-shift gear ratio" hereinafter). If the post-shift gear ratio has not been established when the clutch being released reaches the first target rotational speed difference value $\Delta n1$, then the rotational speed difference of the clutch being released is held at the first target rotational speed difference value $\Delta n1$.

In the inertia phase, the first clutch being released is held in a slipping state and the engagement control quantity of the second clutch (which will be connected in order to achieve the post-shift gear ratio) is adjusted such that the input/output rotational speed difference of the second clutch gradually approaches the second target rotational speed difference value. The entire total torque transfer capacity of the transmission continues to be provided by the first clutch (i.e., the distribution ratio of the clutch being released is 1), but the additive correction torque capacity is added to individual torque capacities of both the first clutch being released and the second clutch being connected in order to achieve the post-shift gear ratio. Consequently, although the second clutch being connected does not contribute to the total torque transfer capacity of the transmission, it does carry a torque capacity corresponding to the additive correction torque capacity of the first clutch being released. The torque added to both the first and second clutches as a result of the additive correction is absorbed as frictional energy of the first and second clutches.

Also, in the interchange phase, the torque capacity calculating section 10B calculates the total torque transfer capacity required for the rotational speed difference of the second clutch (which will be connected in order to achieve the post-shift gear ratio) to be held at the second target rotational speed difference value $\Delta n2$. Meanwhile, the distribution ratio setting section 10C sets the distribution ratios at which torque transfer capacity is distributed to the first clutch being released and the second clutch being connected such that the sum of the torque transfer capacities of the two first and second clutches remains equal to the total torque transfer capacity while the distribution ratio of the first clutch being released gradually decreases and the distribution ratio of the second clutch being connected gradually increases. Additionally, the individual torque transfer capacities of the clutch being released and the clutch being connected are set based on the calculated total torque transfer capacity and the set distribution ratio, and the engagement control quantities of the clutch being released and the clutch being connected are adjusted based on the set individual torque transfer capacities.

In the end phase, the rotational speed difference of the clutch being connected is held at the second target rotational speed difference value $\Delta n2$ and a determination is made as to whether the next shift control will be executed soon (pre-shift determination). If the next shift control will be executed soon (e.g., within a prescribed period of time), then the ECU 3 determines that the predicted gear ratio needs to be established (pre-shifted) and issues a command to establish the predicted gear ratio. Establishing the predicted gear ratio means completing the engagement (i.e., mechanical operation) of a power transmitting element (e.g., a gear set for realizing the target gear ratio) that must be engaged in order to achieve the gear targeted by the next shift control. This engagement of the next gear ratio is also called "pre-shifting." If the next shift control will not be executed soon, then the clutch being released is controlled to rotate in a secondary manner (secondary rotation control). Additionally, in the end phase, the clutch being connected is controlled such that the rotational speed difference thereof is maintained at the second target rotational speed difference value $\Delta n2$ and the transmission is maintained in a state in which the clutch being connected carries the entire total torque transfer capacity (i.e., the distribution ratio of the clutch being connected is held at 1).

In this embodiment, the conditions for transitioning from the preparation phase to the inertia phase are that the rotational speed difference of the clutch being released (i.e., the first clutch that was connected before the current shift control started) has reached the first target rotational speed difference value $\Delta n1$ and establishment of the post-shift gear must has been completed.

Similarly, the condition for transitioning from the inertia phase to the interchange phase is that the rotational speed difference of the second clutch being connected in order to achieve the post-shift gear has reached the second rotational speed difference value $\Delta n2$.

The condition for transitioning from the interchange phase to the end phase is that the control executed during the interchange phase has caused the torque transfer capacity of the first clutch being released to become 0.

The condition for ending the end phase when the next shift control will executed soon is that the establishment of the predicted gear ratio has been completed, and the conditions for ending the end phase when the next shift control will not be executed soon are that the clutch being released is undergoing secondary rotation control and the rotational speed difference of the clutch being connected is within a prescribed range of the second target rotational speed difference value $\Delta n2$.

The target rotational speed difference values $\Delta n1$ and $\Delta n2$ are related to the threshold values used for the phase transitions described above. It is acceptable to set the target rotational speed difference values $\Delta n1$ and $\Delta n2$ to fixed values, but it is also acceptable to set them variably based on the engine load state, i.e., the engine load or a quantity corresponding to the engine load (e.g., a throttle valve opening degree or an engine torque) at the time when the control started or at the time when the particular phase started, or based on at least one of the engine load state and an input rotational speed at the time when the preparation phase started. For example, the target rotational speed differences can be set to increase as the engine load increases or increase as the input rotational speed increases.

The control scheme of a control device in accordance with this embodiment will now be explained in detail with reference to the block diagram shown in FIG. 8.

Figure 8:
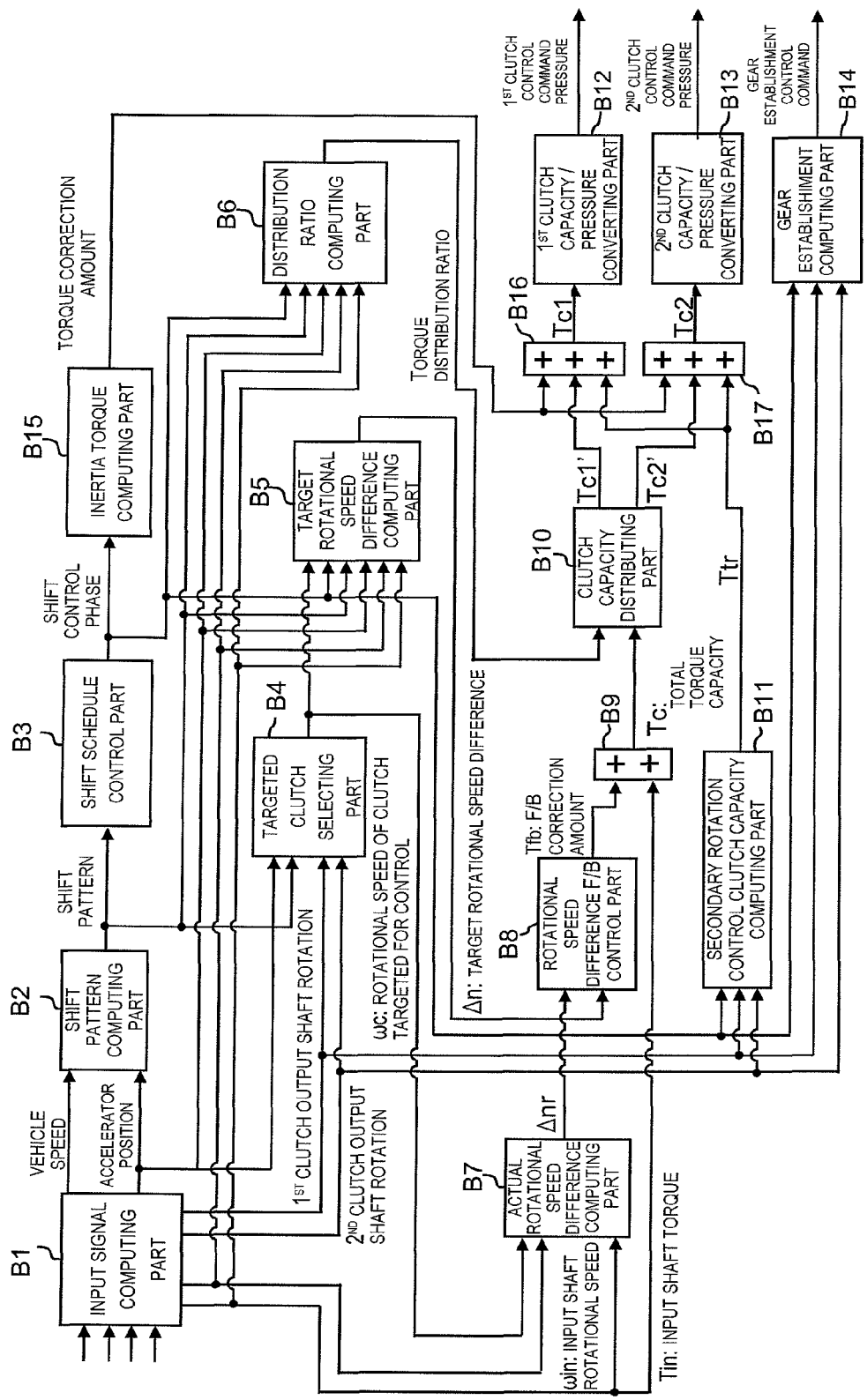
FIG. 8 is a control block diagram showing the control features of a twin-clutch transmission control apparatus in accordance with a first embodiment.

As shown in FIG. 8, the device includes the functional elements shown in FIG. 1. More specifically, the control device is provided with an input signal computing part B1, a shift pattern computing part B2, a shift schedule control part B3, a targeted clutch selecting part B4, a target rotational speed difference computing part B5, a distribution ratio computing part B6, an actual rotational speed difference computing part B7, a rotational speed difference feedback (F/B) control part B8, an adder part B9, a clutch (torque) capacity distributing part B10, a secondary rotation control clutch capacity computing part B11, a first clutch capacity/pressure converting part B12, a second clutch capacity/pressure converting part B13, a gear establishment computing part B14, and an inertia torque computing part B15.

Figure 7:
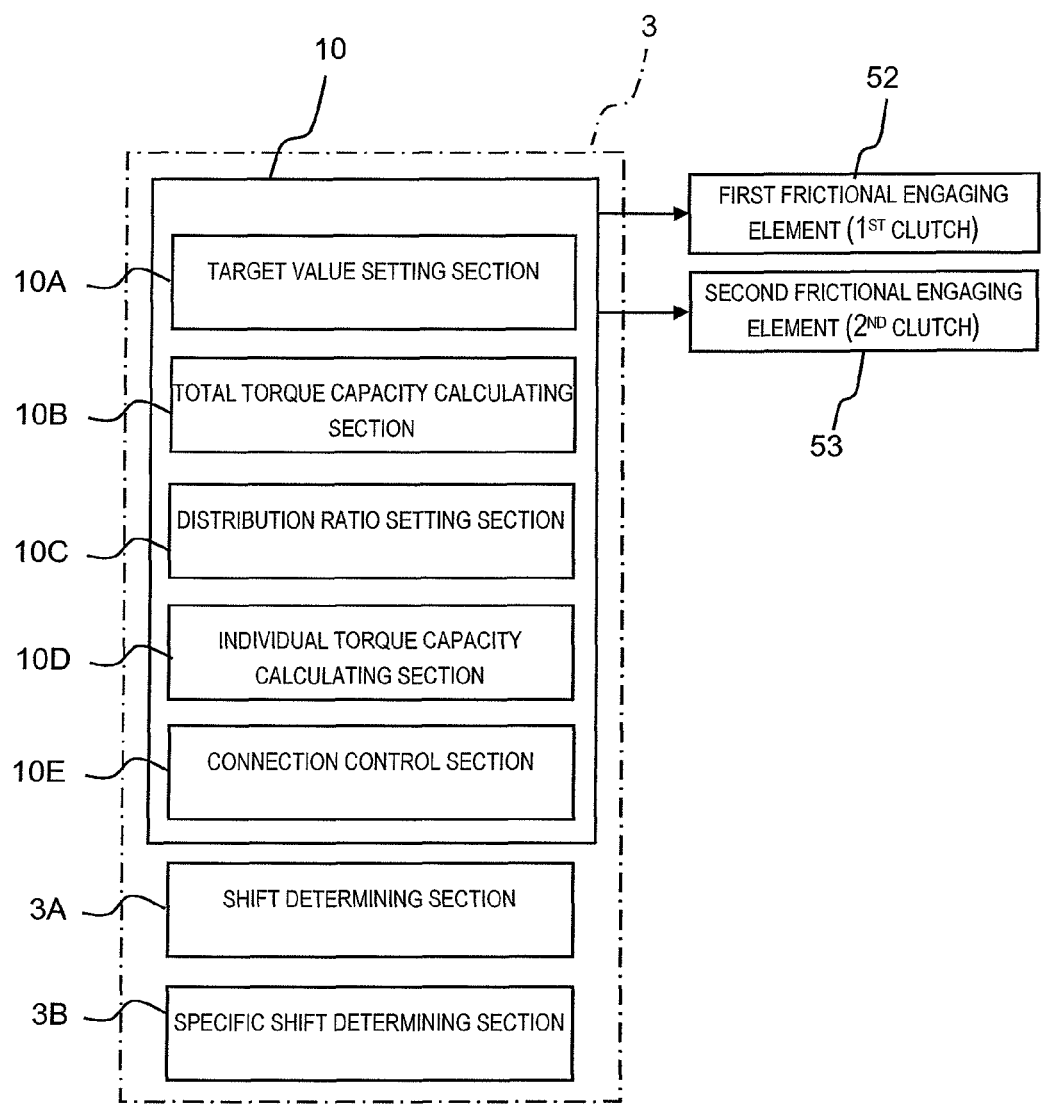
FIG. 7 is a control block diagram showing the important constituent features of a twin-clutch transmission control apparatus in accordance with the illustrated embodiments.

The shift pattern computing part B2 includes the functions of the shift 3B shown in FIG. 7. The target rotational speed difference computing part B5 is equivalent to the target value setting section 10A shown in FIG. 7. The adder part B9 is equivalent to the total torque capacity calculating section 10B shown in FIG. 7. The distribution ratio computing part B6 is equivalent to the distribution ratio setting section 10C shown in FIG. 7. The torque capacity distributing part B10, the inertia torque computing part B15, and the adder parts B16 and B17 are equivalent to the individual torque capacity calculating section 10D shown in FIG. 7. The first and second clutch capacity/pressure converting parts B12 and B13 are equivalent to the connection control section 10E shown in FIG. 7.

First, the input signal computing part B1 processes some input signals. The input signals include a wheel speed signal for generating a vehicle speed signal, an accelerator position signal for generating an accelerator depression amount signal, an input shaft signal indicating the input-side rotational speed of the first clutch and the second clutch, a first output shaft signal indicating the output-side rotational speed of the first clutch, and a second output shaft signal indicating the output-side rotational speed of the second clutch.

The shift pattern computing part B2 generates a shift pattern based on the vehicle speed sensor and accelerator depression amount signal received from the input signal computing part B1 by comparing to a shift map prepared in advance. The shift pattern includes non-shift states, too.

The shift schedule control part B3 monitors the shift pattern, the output-side rotational speed $\omega c$ of the clutch targeted for control, and the torque capacity distribution ratio R of both clutches. In this way, it determines the state of progress of the control and generates the shift control phases by selecting from among the preparation phase, the interchange phase, the inertia phase, and the end phase.

The targeted clutch selecting part B4 selects the clutch targeted for control during each shift control based on the shift pattern generated by the shift pattern computing part B2 and the shift control phase generated by the shift schedule control part B3 and generates an output-side rotational speed $\omega c$ of the targeted clutch based on the output rotational speed signal of the selected clutch.

The target rotational speed difference computing part B5 sets a target rotational speed difference value $\Delta n$ ($\Delta n1$ or $\Delta n2$) during each shift control based on the shift phase generated by the shift schedule control part B3 and the output-side rotational speed $\omega c$ of the clutch targeted for control. When the sign of the input shaft torque Tin is positive, the target rotational speed difference value $\Delta n$ is set such that the input-side rotational speed (input shaft rotational speed) $\omega in$ of the targeted clutch is larger than the output-side rotational speed $\omega c$. Conversely, when the sign of the input shaft Tin is negative, the target rotational speed difference value $\Delta n$ is set such that the input-side rotational speed $\omega in$ of the targeted clutch is smaller than the output-side rotational speed $\omega c$. Thus, when the vehicle is in a power-off state, the target rotational speed difference value $\Delta n$ is set such that the input-side rotational speed of the clutch targeted for control is smaller than the output-side rotational speed.

The distribution ratio computing part B6 generates a clutch torque capacity distribution ratio R during each shift control based on the shift control phase.

The actual rotational speed difference computing part B7 computes an actual rotational speed difference between the rotational speed of the targeted clutch and the input shaft rotational speed. The sign (positive or negative) of the input shaft torque is taken into account when calculating the actual rotational speed difference value $\Delta nr$.

The rotational speed difference feedback (F/B) control part B8 generates a feedback control quantity (F/B correction amount) Tfb for the target rotational speed difference value based on the actual rotational speed difference value $\Delta nr$ of the targeted clutch and the target rotational speed difference value $\Delta n$.

The adder part B9 generates a total torque capacity Tc of the clutch by finding the sum of the F/B correction amount Tfb generated by the rotational speed difference feedback (F/B) control part B8 and the input shaft torque Tin (which is equivalent to an open control amount).

The torque capacity distributing part B10 distributes the total torque capacity Tc calculated by the adder part B9 to the clutches in accordance with the torque capacity distribution ratio R generated by the distribution ratio computing part B6 to obtain a first clutch capacity Tc1' and a second clutch capacity Tc2'.

The secondary rotation control clutch capacity computing part B11 calculates a torque capacity Ttr required to execute secondary rotation control of the non-drive clutch (non-drive shaft). However, if it has been determined that the next shift control will start soon (i.e., that pre-shift control will be executed), then this torque capacity Ttr is set to 0.

The adder part B16 generates a torque capacity Tc1 of the first clutch by finding the sum of the first clutch capacity Tc1' generated by the torque capacity distributing part B10 and the torque capacity Ttr generated by the secondary rotation control clutch capacity computing part B11.

The adder part B17 generates a torque capacity Tc2 of the second clutch by finding the sum of the second clutch capacity Tc2' generated by the torque capacity distributing part B10 and the torque capacity Ttr generated by the secondary rotation control clutch capacity computing part B11.

The first clutch capacity/pressure converting part B12 converts the first clutch capacity Tc1 into a first clutch control command pressure, and the second clutch capacity/pressure converting part B13 converts the second clutch capacity Tc2 into a second clutch control command pressure. These command pressures are used to execute control of the clutches.

The gear establishment control part B14 serves to issue a command for establishing a gear when the automatic transmission is configured such that the gear ratios are established by a mechanical operation other than by merely connecting and releasing the first and second clutches, e.g., by switching gear trains using a synchronizer. The gear establishment control part B14 constitutes a gear establishment control section. However, the gear establishment control part B14 is omitted if the automatic transmission 1 does not require such a mechanical operation.

The inertia torque computing part B15 calculates an inertial torque to be consumed based on the rate of change (derivative value) of the target rotational speed difference during the inertia phase. The inertia torque to be consumed is set as the additive correction torque capacity and added to the torque capacities of both first and second clutches in order to generate frictional losses in the two first and second clutches. The frictional losses serve to cancel out (consume) the inertia torque. In other words, the inertia torque is consumed by the frictional losses of the two first and second clutches. As a result, the inertia torque can be consumed in an aggressive fashion even during power-off upshifting, when the engine torque cannot be controlled. It is preferable for the additive correction executed in the inertia phase to be configured to commence adding the additive correction torque capacity (which is initially set to as large a value as possible without being excessive in view of the strength and durability of the clutches) from the start of the inertia phase and gradually decrease the additive correction torque capacity starting from a point in time occurring before the end of the inertia phase such that the additive correction torque capacity reaches 0 by the end of the inertia phase.

An example of the shift control executed by an automatic transmission control apparatus in accordance with this embodiment (as described above) during power-off upshifting will now be explained with reference to the flowchart shown in FIG. 9.

Figure 9:
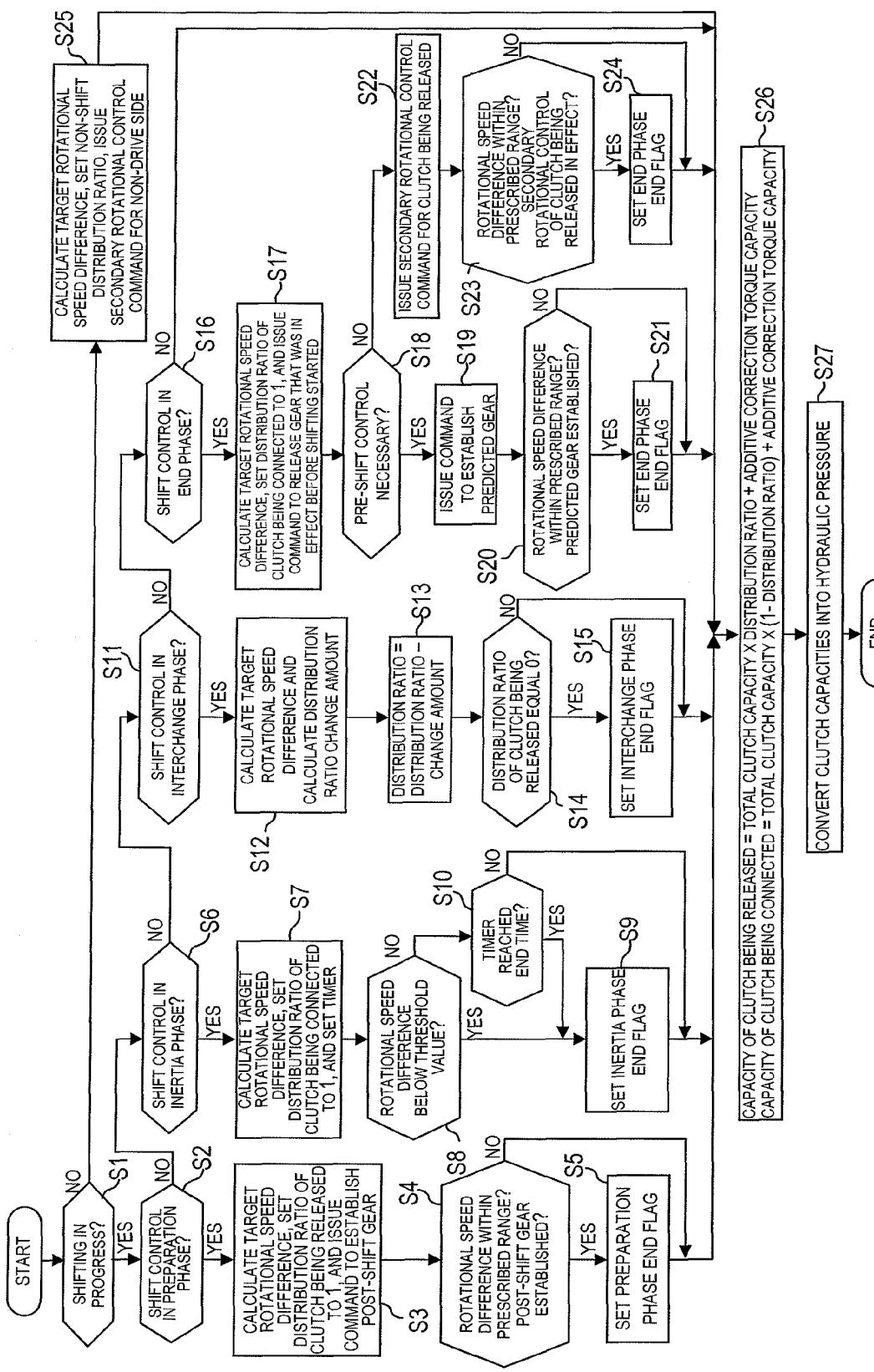
FIG. 9 is a flowchart for explaining the automatic transmission shift control executed in the first embodiment.

As shown in FIG. 9, in step S1, the ECU 3 determines if shift control is in progress (i.e., if power-off upshift control is in progress). If the ECU 3 determines that shift control is in progress, then the ECU 3 proceeds to step S2 and determines if the shift control is in the preparation phase. If the shift control is just starting, then the preparation phase is selected first.

If the control is in the preparation phase, then the ECU 3 proceeds to step S3 and sets a target rotational speed difference value $\Delta n1$ as a target value for rotational speed difference control. The target rotational speed difference value $\Delta n1$ is a pre-shift control target value (pre-shift target rotational speed difference). If the transmission is upshifting, then the pre-shift control target value is set to a smaller value than the rotational speed existing at the time when shift control started. At the same time, in step S3, the ECU 3 fixes the distribution ratio of the first clutch that will be released at 1 and fixes the distribution ratio of the second clutch that will be connected at 0. Also, the targeted gear is established (engaged) by means of a synchronizer.

In step S4, the ECU 3 determines if the actual rotational speed difference of the first clutch that will be released is within a prescribed range in the vicinity of the pre-shift target rotational speed difference value $\Delta n1$. In this embodiment, since the establishment of the post-shift gear ratio requires a mechanical switching operation by frictional engagement elements other than the first and second clutches, the condition that the post-shift gear ratio has been established by the mechanical operation is added to the condition that the actual rotational speed difference be within the prescribed range of the pre-shift target rotational speed difference value $\Delta n1$ in step S4. Thus, step S4 has the form of a conditional AND operation.

If the actual rotational speed difference of the first clutch being released has not reached the pre-shift target rotational speed difference value $\Delta n1$ or if the post-shift gear has not been established, then the ECU 3 proceeds to steps S26 and S27 where it executes a clutch capacity computation and a clutch command hydraulic pressure computation.

More specifically, in step S26, the ECU 3 calculates a torque capacity of the clutch being released and a torque capacity of the clutch being connected based on the total clutch capacity and distribution ratio calculated at the current point in time and the additive correction torque capacity calculated in the inertia phase. In step S27, the ECU 3 determines a command pressure for each of the clutches based on the torque capacities calculated in step S26 and a torque capacity versus hydraulic pressure conversion characteristic and issues the command pressures to the actuators of the clutches.

In this way, by repeating the steps S1, S2, S3, S4, S26, and S27 in each control cycle so as to execute the preparation phase, the ECU 3 adjusts the actual rotational speed difference into the prescribed range of the target rotational speed difference value $\Delta n1$ and establishes the post-shift gear ratio.

As a result, eventually, the ECU 3 determines in step S4 that the actual rotational speed difference of the clutch being released has entered into the prescribed range of the pre-shift target rotational speed difference value $\Delta n1$ and that the post-shift gear has been established.

When this occurs, the preparation phase ends and, in step S5, a preparation phase end flag is set to trigger a transition to the inertia phase. As a result, in the next control cycle, the ECU 3 determines that the control is not in the preparation phase in step S2 and proceeds to step S6, where it determines if the control is in the inertia phase. At this stage, the ECU 3 determines that the control is in the inertia phase and makes the transition to the inertia phase.

During the inertia phase, in step S7, the ECU 3 changes the target of the rotational speed control to the second clutch that will be connected and sets the target rotational speed difference value $\Delta n2$ as the control target value. At the same time, the distribution ratio of the first clutch being released is set to 1 and the distribution ratio of the second clutch being connected is set to 0. Additionally, the ECU 3 starts a timer for counting the time of the inertia phase. In step S8, the ECU 3 compares the target rotational speed difference value $\Delta n2$ and the actual rotational speed difference of the second clutch being connected to determine if the actual rotational speed difference has entered a prescribed range in the vicinity of the target rotational speed difference value $\Delta n2$.

If the actual rotational speed difference has not reached the prescribed range of the target rotational speed difference value $\Delta n2$, then in step S10 the ECU 3 determines if the timer that was started when the inertia phase started has reached an end value (prescribed amount of time).

The timer end value (prescribed amount of time) is an amount of time required for the actual rotational speed difference to enter into the prescribed range of the target rotational speed difference value Δn2. The timer end value (prescribed amount of time) is set based on the engine load at that point in time or a quantity corresponding to the engine load (e.g., a throttle valve opening degree), the input torque of the transmission or a quantity corresponding to the input torque, and an input shaft rotational speed, the input shaft rotational speed of the clutch targeted for control, or a gear ratio. By setting the time appropriately based on the shift conditions, a balance can be obtained between limiting the duration of the inertia phase (not allowing the inertia phase to last too long) and alleviating the clutch connection shock.

If the timer end value has not been reached, then the ECU 3 calculates a final connection capacity for the clutch being released and a final connection capacity for the clutch being connected (step S26) and converts the connection capacities into a command hydraulic pressure for the clutch being released and a command hydraulic pressure for the clutch being connected (step S27). The ECU 3 then issues the commands to the actuators of the clutches.

Also, the additive correction torque capacity is added to the connection capacity for the clutch being released and the connection capacity for the clutch being connected before converting them to command pressures. That is, the ECU 3 calculates the inertia torque to be consumed based on the change rate (derivative value) of the target rotational speed calculated by the inertia torque computing part B15 and adds an additive correction torque capacity corresponding to the inertia torque to the torque capacity of each of the first and second clutches. As a result, the first and second clutches generate frictional losses corresponding to the amount of the additive correction torque capacities and the frictional losses consume the inertia torque, thereby causing the input shaft rotational speed to decrease quickly. Thus, even in the case of power-off upshifting in which the inertia torque cannot be absorbed with engine torque control, the inertia torque can be absorbed and the time required to complete the inertia phase can be greatly reduced. The additive correction torque capacities added to the first and second clutches are merely absorbed as frictional losses of the first and second clutches and the power transfer is carried by the first clutch being released.

The ECU 3 repeats the control cycle of the inertia phase until either the actual rotational speed difference reaches the target rotational speed difference value Δn2 or the timer reaches the end value (prescribed amount of time). Then, the ECU 3 proceeds from step S8 to step S9 or from step S10 to step S9. In step S9, the ECU 3 ends the inertia phase and sets an inertia phase end flag to trigger a transition to the interchange phase.

As a result, in the next control cycle, the ECU 3 passes through steps S1 and S2, determines that the control is not in the inertia phase in step S6, and proceeds to step S11, where it determines if the control is in the interchange phase. At this stage, the ECU 3 determines that the control is in the interchange phase and makes the transition to the interchange phase.

During the interchange phase, in step S12 the ECU 3 holds the target value of the rotational speed difference control at the target rotational speed difference value Δn2 and sets a distribution ratio change amount (amount of change per control cycle) such that the distribution ratio of the first clutch being released gradually decreases at a prescribed change rate and the distribution ratio of the second clutch being connected gradually increases at a prescribed change rate. In step S13, the ECU 3 sets the distribution ratio of the first clutch being released to the value obtained by subtracting the distribution ratio change amount from the distribution ratio of the first clutch in the previous control cycle and sets the distribution ratio of the second clutch being connected to the value obtained by adding the distribution ratio change amount to the distribution ratio of the second clutch in the previous control cycle. In step S14, the ECU 3 determines if the distribution ratio of the first clutch being released is 0.

The distribution ratio of the first clutch does not reach 0 for while after the interchange phase starts. During the interchange phase, the processing of steps S26 and S27 continues to be executed based on the set distribution ratio. Thus, the ECU 3 calculates a final connection capacity for the clutch being released and a final connection capacity for the clutch being connected (step S26) and converts the connection capacities into a command hydraulic pressure for the clutch being released and a command hydraulic pressure for the clutch being connected (step S27). The ECU 3 then issues the commands to the actuators of the clutches.

As the processing steps comprising the interchange phase are repeated, the distribution ratio of the first clutch being released is gradually decreased each time step S13 is executed until, eventually, the ECU 3 determines in step S14 that the distribution ratio of the first clutch being released is 0. The ECU 3 then proceeds to step S15, where it ends the interchange phase and sets an interchange phase end flag to trigger a transition to the end phase.

As a result, in the next control cycle, the ECU 3 passes through steps S1, S2, and S6, determines that the control is not in the interchange phase in step S11, and proceeds to step S16, where it determines if the control is in the end phase. At this stage, the ECU 3 determines that the control is in the end phase and makes the transition to the interchange phase.

During the end phase, in step S17 the ECU 3 holds the target rotational speed difference of the clutch being connected at the second target rotational speed difference value Δn2 and, at the same time, fixes the distribution ratio of the clutch being released at 0 and the distribution ratio of the clutch being connected at 1. The ECU 3 also issues an instruction for releasing the pre-shift gear ratio (releasing the gear engagement). In step S18, the ECU 18 determines if pre-shift control is necessary, i.e., if the next shift control will be executed soon. If the next shift control will be executed soon, then pre-shift control is necessary. Otherwise, pre-shift control is not necessary.

If pre-shift control is determined to be necessary, then in step S19 the ECU 3 issues a command for establishing the gear ratio that is predicted to be shifted to next. Then, in step S20, the ECU 3 determines if the rotational speed difference of the clutch being connected is within a prescribed range and if the predicted gear has been established. If these two conditions are not satisfied, then the ECU 3 continues the end phase. If these two conditions are satisfied, then the ECU 3 proceeds to step S21 and sets an end phase end flag to end the shift control.

Meanwhile, if it determines in step S18 that pre-shift control is not necessary, then the ECU 3 issues a command for secondary rotation control of the clutch being released in step S22. Then, in step S23, the ECU 3 determines if the rotational speed difference of the clutch being connected is within a prescribed range and if the secondary rotation control of the clutch being released has ended. If these two conditions are not satisfied, then the ECU 3 continues the end phase. If these two conditions are satisfied, then the ECU 3 proceeds to step S24 and sets an end phase end flag to end the shift control.

During the end phase, the ECU 3 continues to calculate a final connection capacity for the clutch being released and a final connection capacity for the clutch being connected (step S26) and convert the connection capacities into a command hydraulic pressure for the clutch being released and a command hydraulic pressure for the clutch being connected (step S27). The ECU 3 then issues the commands to the actuators of the clutches.

In step S21 or S24, the end phase end flag is set and the current shift control ends. In the next control cycle, the ECU 3 determines in step S1 that shifting is not in progress (the vehicle is traveling normally). The ECU 3 then proceeds to step 25, where it calculates a target rotational speed difference, sets non-shift distribution ratio, and executes secondary rotation control of the non-drive shaft.

The processing steps shown in the flowchart described above are executed repeatedly in accordance with a prescribed control cycle time.

The shift control in accordance with this embodiment will now be explained with reference to the time series operation diagrams (time charts) shown in FIGS. 10 and 11, which illustrate the operation of the control device in the case of a power-off upshift (upshift that takes place while the engine load is decreasing due to release of the accelerator pedal). The time charts illustrate concrete examples of power-off upshift situations.

Figure 10:
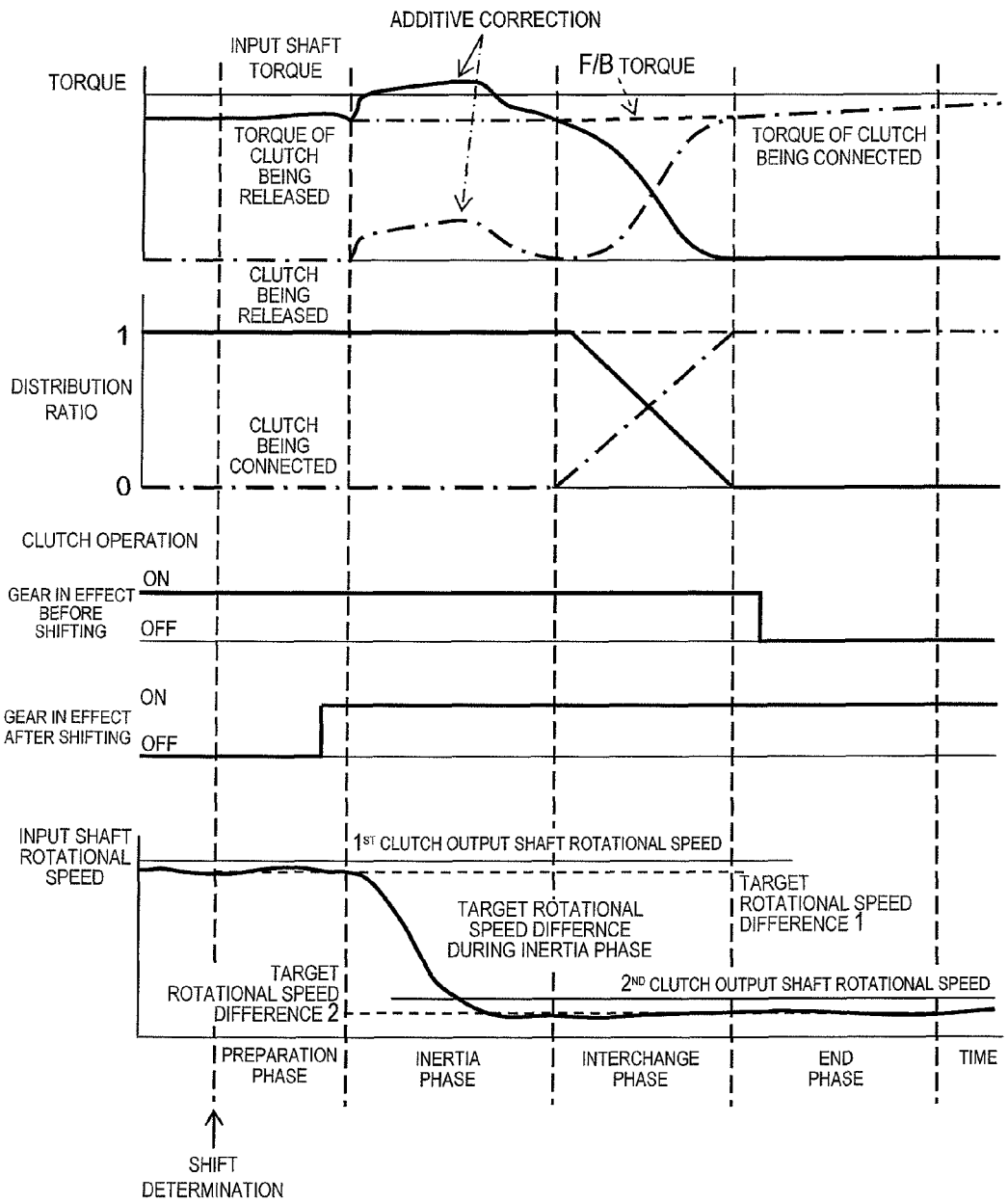
FIG. 10 is a time chart for explaining an example of the automatic transmission shift control executed in the first embodiment.

FIG. 10 is a time chart illustrating an example in which it is determined in the end phase that pre-shift control is not necessary. First, in the preparation phase, the ECU 3 sets the target rotational speed difference value 1 (first target rotational speed difference value $\Delta n1$) and executes control such that the actual rotational speed difference of the first clutch targeted for control (clutch that is connected before or after shifting) follows the target rotational speed difference value 1. At the same time, the post-shift gear ratio is established.

Next, in the inertia phase, the ECU 3 changes the clutch targeted for the rotational speed difference control to the second clutch, calculates a path along which the target rotational speed difference will change from the current rotational speed difference value of the second clutch to the post-shift target rotational speed difference value 2 (second target rotational speed difference value $\Delta n2$), and executes control to make the actual rotational speed difference follow the target rotational speed difference. The ECU 3 also calculates the inertia torque generated as a result of the change in the input shaft rotational speed and controls the clutches so as to cancel out the inertia torque with frictional losses. That is, the ECU 3 calculates the inertia torque to be consumed based on the change rate (derivative value) of the target rotational speed calculated by the inertia torque computing part B15 and adds an additive correction torque capacity corresponding to the inertia torque to each of the first and second clutches. The first and second clutches generate frictional losses corresponding to the amount of the additive correction torque capacities and the frictional losses consume the inertia torque, thereby causing the input shaft rotational speed to decrease quickly.

In the interchange phase, the ECU 3 continues the rotational speed difference control of the inertia phase while also executing torque distribution ratio control such that the currently connected first clutch is released and the currently released second clutch is connected.

In the end phase, the ECU 3 sets the target rotational speed difference value 2 and executes control such that the actual rotational speed of the second clutch follows the target rotational speed difference value 2. At the same time, if the automatic transmission requires a gear train configuration change to be made using a synchronizer, the ECU 3 releases the gear ratio in effect before shifting (i.e., prior to the current shift operation) and allots a prescribed amount of torque to the released clutch so as to execute secondary shaft rotation control of the released clutch.

Figure 11:
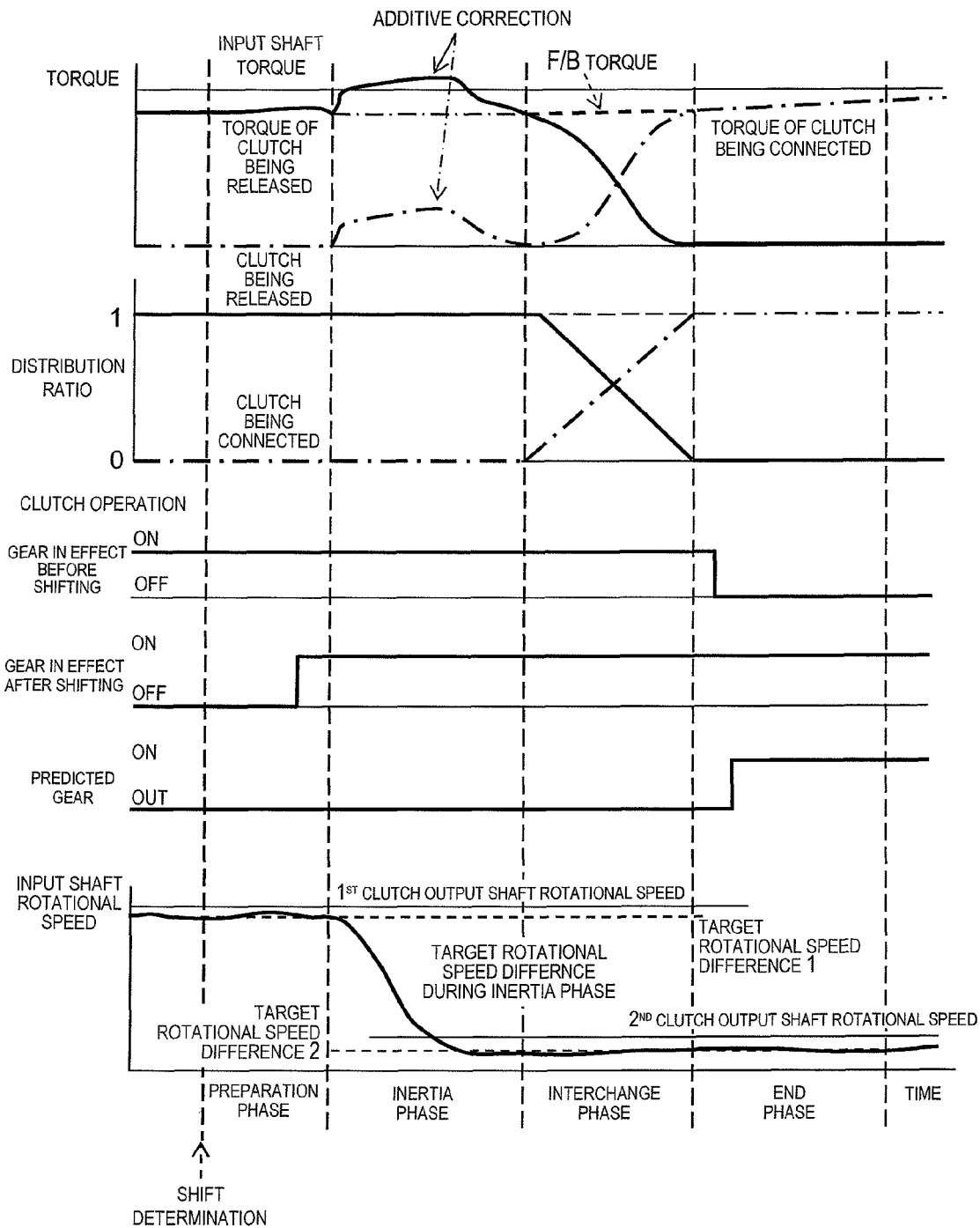
FIG. 11 is a time chart for explaining another example of the automatic transmission shift control executed in the first embodiment.

FIG. 11 is a time chart illustrating an example in which it is determined in the end phase that pre-shift control is necessary. Consequently, the example shown in FIG. 11 is basically the same as the example shown in FIG. 10, except that the end phase is different. In the end phase of the example shown in FIG. 11, the ECU 3 sets the target rotational speed difference value 2 of the second clutch and executes control such that the actual rotational speed difference of the second clutch follows the target rotational speed difference value 2. At the same time, if the automatic transmission requires a gear train configuration change to be made using a synchronizer, then the ECU 3 releases the gear in effect before shifting and sets a predicted gear.

By defining the rotational speed difference in this way in this embodiment, the same control logic can be used for both power-on and power-off travel by switching the method of calculating the rotational speed difference in accordance with the running state (power-on or power-off). Thus, with a transmission control in accordance with this embodiment, the total torque capacity used for executing a power-on downshift is calculated as the sum of the input torque delivered to the transmission and a correction value calculated based on the deviation between the target rotational speed difference and the actual rotational speed difference obtained with a feedback control. Consequently, the total torque capacity is set appropriately with a simple logic scheme and smooth power-on downshifting can be accomplished.

Additionally, in each control phase, the rotational speed of the clutch is controlled while focusing on the distribution of the transferred torque. Meanwhile, the interchange control is divided into a control focused on the torque and a control focused on the rotational speed but ultimately delivers a single control quantity. As a result, a smooth interchange operation can be achieved with a simple control logic.

Also, the interchange phase is contrived such that the timing at which the first clutch used for power transmission with the gear in effect before shifting is changed from a connected state to a released state can be perfectly synchronized with the timing at which the second clutch used for power transmission with the post-shift gear is changed from a released state to a connected state. As a result, an even smoother and more stable shift control can be accomplished with little shock.

When the transmission is upshifted while the vehicle is traveling in a power-off state, an additive correction torque capacity corresponding to the inertia torque that needs to be consumed is added to the connection capacity of the first clutch being released and to the connection capacity of the second clutch being connected. In FIG. 10, the value of the torque of the clutch being released that would be obtained if the additive correction were not executed is indicated with a single-dot chain line. The value of the torque of the clutch that is being connected would be 0 if the additive correction were not executed.

Conversely, when the additive correction is executed, the first and second clutches generate frictional losses corresponding to the amount of the additive correction torque capacities and the frictional losses consume the inertia torque, thereby causing the input shaft rotational speed to decrease quickly. Thus, even in the case of power-off upshifting in which the inertia torque cannot be absorbed with engine torque control, the inertia torque can be absorbed and the time required to complete the inertia phase can be reduced, thereby reducing the time require for shifting. The additive correction torque capacities added to the first and second clutches are merely absorbed as frictional losses of the first and second clutches and the power transfer is carried by the first clutch being released. As a result, the shift control can be executed smoothly.

If the additive correction executed in the inertia phase is configured to commence adding the additive correction torque capacity from the start of the inertia phase and to set the additive correction torque capacity to as large a value as possible without being excessive in view of the strength and durability of the clutches, then the inertia torque can be consumed in a manner that protects the clutches while shortening the time required for the inertia phase. Additionally, by gradually reducing the additive correction torque capacity from a point in time occurring before the end of the inertia phase such that the additive correction torque capacity becomes 0 by the time the inertia phase ends, the transition to the next phase (interchange phase) can be made more smoothly.

Second Embodiment

In this embodiment, a rotational speed difference control of the clutches has been replaced with rotational speed control (rpm control) of the input shaft. In other words, the rotational speed difference control of the previous embodiment controls the difference between the input rotational speed and the output rotational speed of a clutch. However, in this embodiment, the input shaft rotational speed control correlates the input shaft rotational speed of the input shaft to the input rotational speed of the clutch and correlates the vehicle speed and the gear ratio used with the particular clutch to the output rotational speed of the clutch. Rotational speed difference control of the clutches can be replaced with rotational speed control of the input shaft because it can be assumed that the vehicle speed remains substantially unchanged during shifting.

FIGS. 12 to 15 illustrate a twin-clutch transmission control apparatus and a twin-clutch transmission control method in accordance with a second embodiment of the present invention. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. In other word, this embodiment will be explained with reference to the block diagram, the flowchart, and the time charts shown in FIGS. 12 to 15 while focusing particularly on the differences with respect to the first embodiment.

Figure 12:
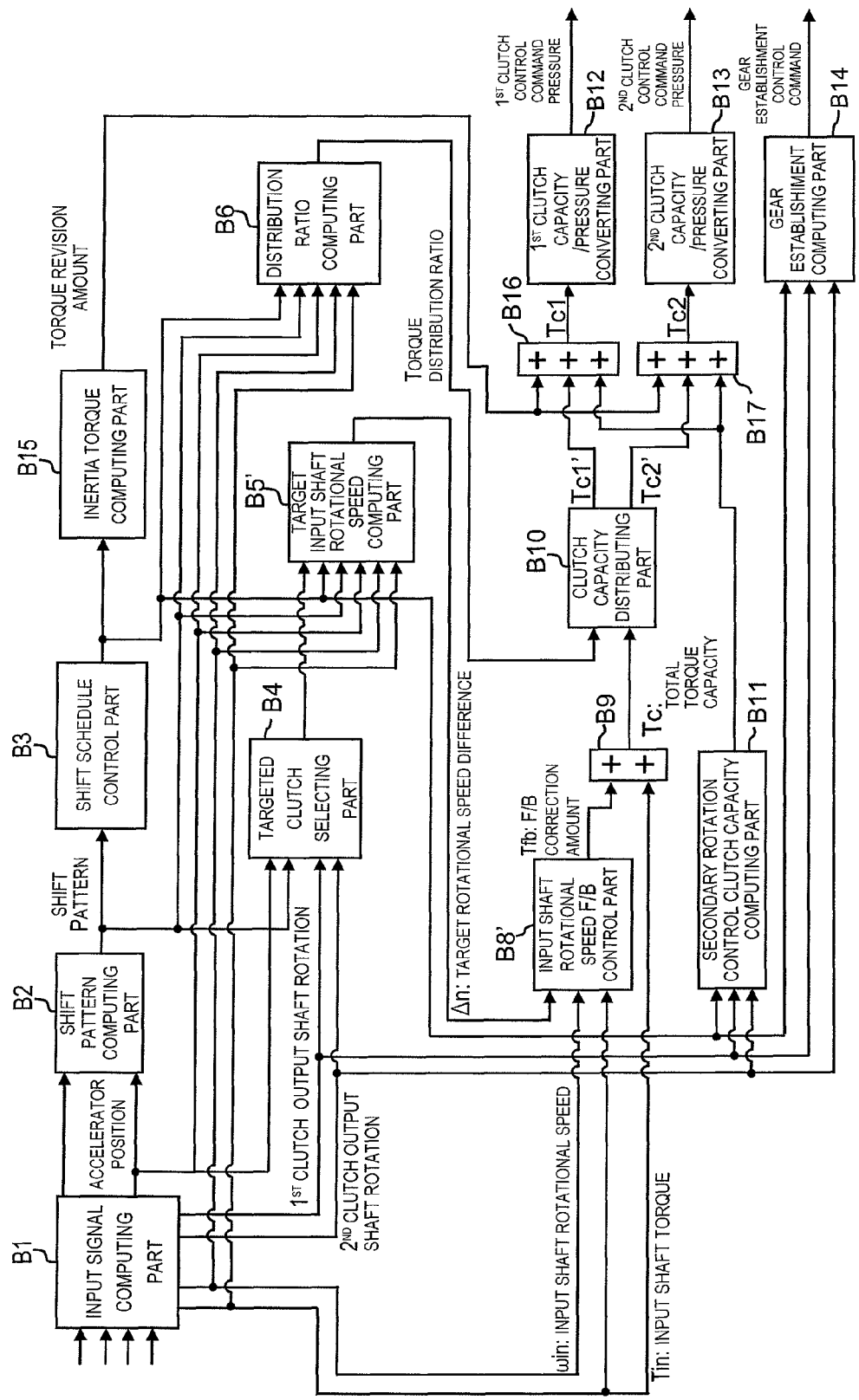
FIG. 12 is a control block diagram showing the control features of a twin-clutch transmission control apparatus in accordance with a second embodiment.

FIG. 12 is a block diagram showing the control scheme of this embodiment. In the first embodiment a target rotational speed difference of the clutch targeted for control is set and the actual rotational speed difference is controlled based on the target rotational speed difference. However, in this embodiment, a target input shaft rotational speed is set with respect to the clutch targeted for control and the actual input shaft rotational speed is controlled based on the target input shaft rotational speed. Thus, the block diagram of FIG. 12 is basically the same as the block diagram of FIG. 8, except that the actual rotational speed difference computing part B7 has been deleted and the target rotational speed difference computing part B5 and the input shaft rotational speed feedback (F/B) control part B8 have been changed to a target input shaft rotational speed computing part B5' and the input shaft rotational speed feedback (F/B) control part B8'. Ultimately, a logic configured to control the rotational speed difference has merely been replaced with a logic configured to control the actual rotational speed and the effect of the control is the same.

Figure 13:
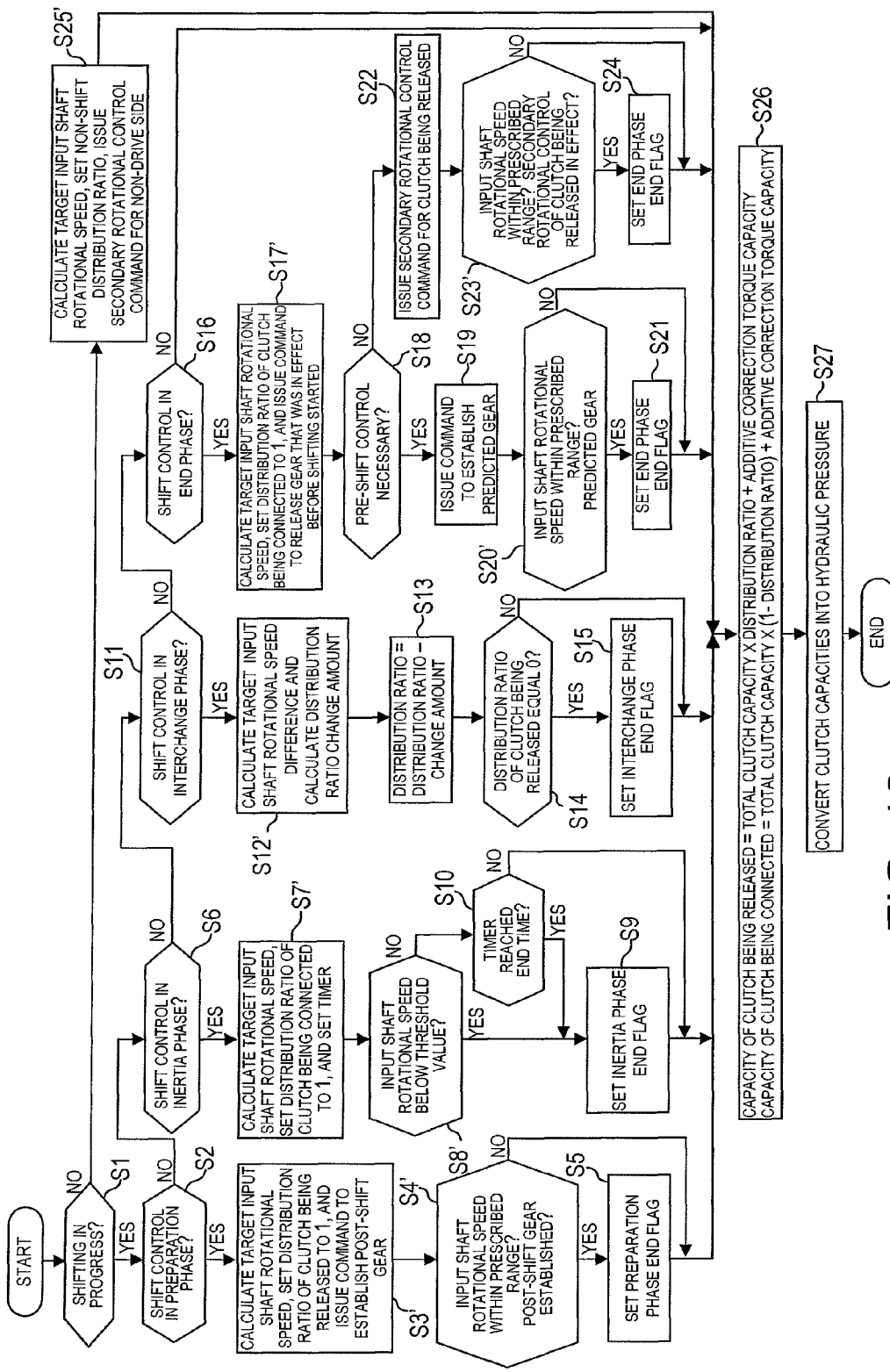
FIG. 13 is a flowchart for explaining the automatic transmission shift control executed in the second embodiment.

FIG. 13 is a flowchart of the control executed in this embodiment. Steps S3', S4', S7', S8', S12', S17', S20', S23', and S25' of FIG. 13 correspond to steps S3, S4, S7, S8, S12, S17, S20, S23, and S25 of FIG. 9, except that "target rotational speed difference" has been changed to "target input shaft speed." Thus, a logic configured to control the rotational speed difference has merely been replaced with a logic configured to control the actual rotational speed and the effect of the control is the same. In other words, in this embodiment, control is conducted based on the target input shaft speed of the input shaft 51 in the case of the transmission of FIG. 6, instead of the rotational speed difference of one of the first and second clutches 52 and 53.

Figure 14:
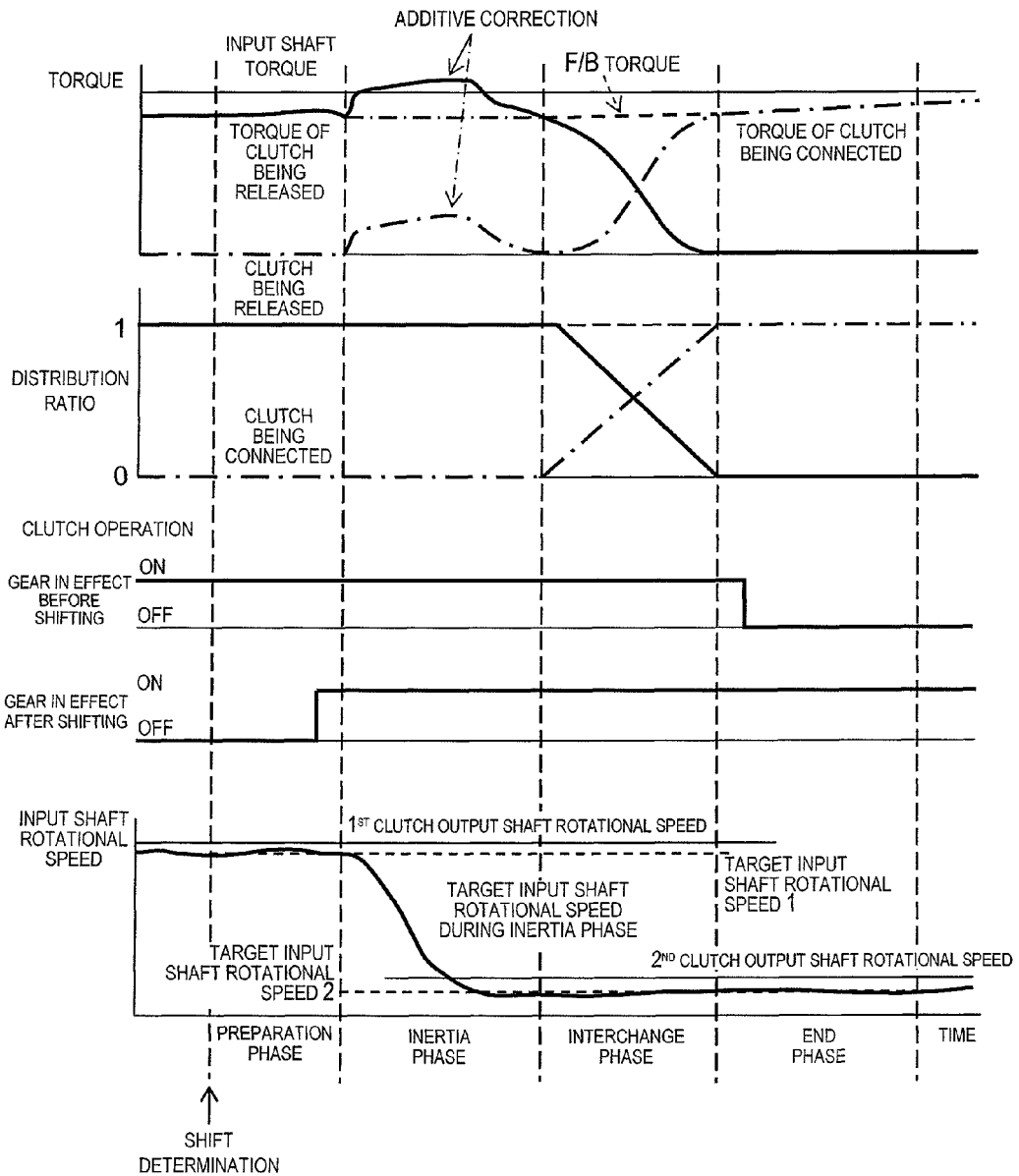
FIG. 14 is a time chart for explaining an example of the automatic transmission shift control executed in the second embodiment.

FIG. 14 is a time chart illustrating an example in which, during a power-on upshift in accordance with this embodiment, it is determined in the end phase that pre-shift control is not necessary. In this embodiment, the rotational speed difference control logic of the first embodiment has been replaced with an input shaft rotational speed control logic. The effects of the control are the same as the effects of the control shown in FIG. 10.

Figure 15:
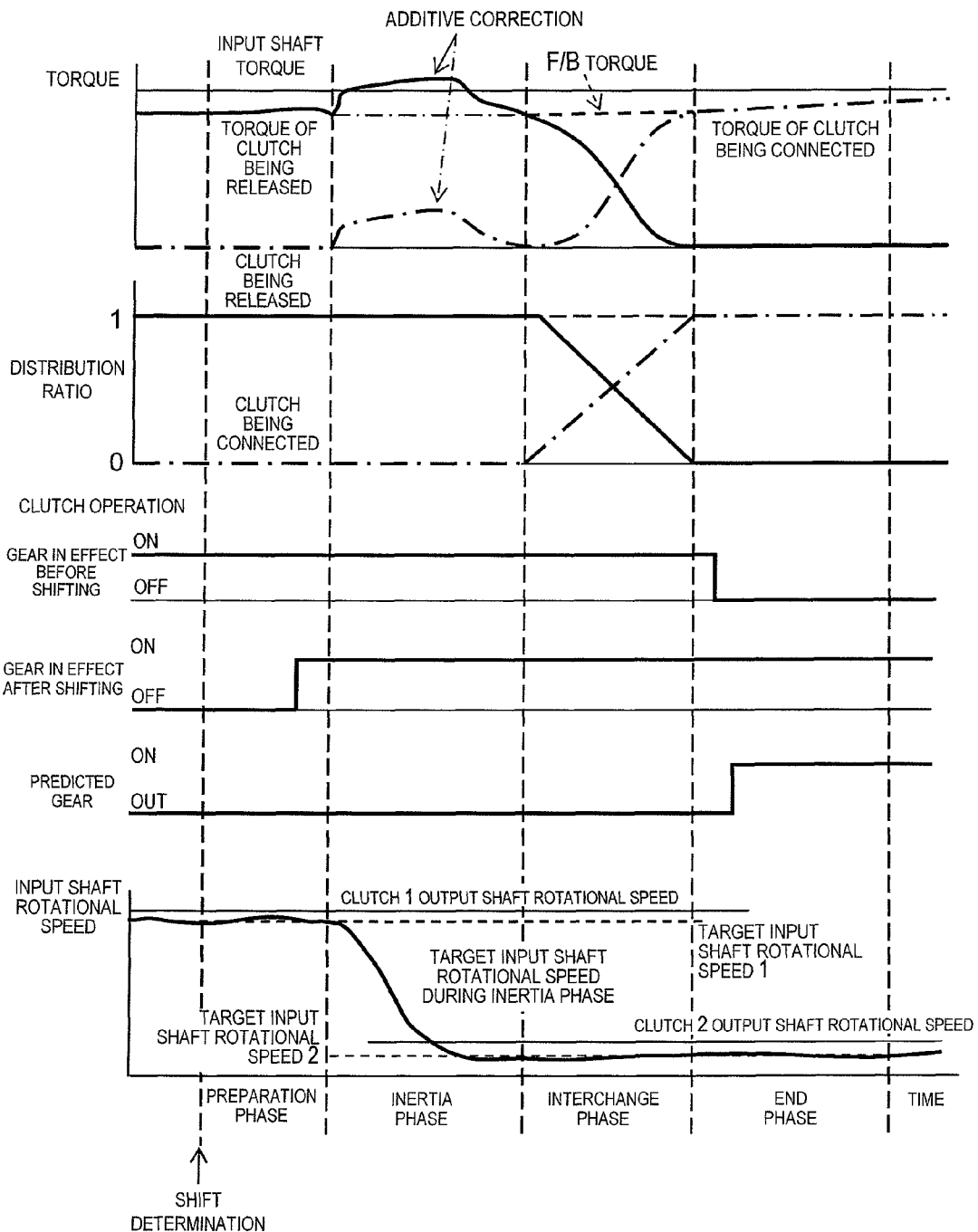
FIG. 15 is a time chart for explaining another example of the automatic transmission shift control executed in the second embodiment.

FIG. 15 is a time chart illustrating an example in which, during a power-on upshift in accordance with this embodiment, it is determined in the end phase that pre-shift control is necessary. In this example, too, the rotational speed difference control logic of the first embodiment has been replaced with an input shaft rotational speed control logic and the effects of the control are the same as the effects of the control shown in FIG. 11.

In this way, the same operational effects as the first embodiment can be obtained by executing a control that is basically the same as the control of the first embodiment except that it focuses on a target value of the input shaft.

The rotational speed of the input shaft changes as a result of the input shaft rotational speed control mentioned above and this rotational speed change causes an inertia torque to develop. A method of calculating the clutch capacities required to cancel out the inertia torque with frictional losses of the clutches will now be explained.

The variables used in the calculation are defined as shown below and as shown in FIG. 16.
  Variables related to torque:
    Tin: input shaft torque
    Tc1: torque transferred by the first clutch
    Tc2: torque transferred by the second clutch
    To: output shaft torque
  Variables related to clutch capacity
    C1: first clutch capacity
    C2: second clutch capacity
    C10: first clutch capacity (at start of shifting)
    C20: second clutch capacity (at start of shifting)
  Variables related to angular velocity
    $\omega$in: input shaft angular velocity
    $\omega$1: first clutch angular velocity
    $\omega$2: second clutch angular velocity
    $\omega$0: output shaft angular velocity
  Variables Related to Inertia
    Iin: input shaft inertia
    Ic1: inertial of first clutch
    Ic2: inertial of second clutch
  Variables related to gears
    r1: gear ratio in effect before shifting
    r2: gear ratio in effect after shifting Using the variables defined above, the input and output relationships shown in Equations 1 and 2 can be obtained.

Mathematical Expressions 1
Basic Equations
Input-side equation:

$$T_e = T_{C1} + T_{C2} + I_e \dot{\omega}_e \quad \text{(Equation 1)}$$

Output-side equation:

$$T_0 = r_1(T_{C1} - I_{C1}\dot{\omega}_1) + r_2(T_{C2} - I_{C2}\dot{\omega}_2) \quad \text{(Equation 2)}$$

Assumed Conditions
Conditions regarding state before shifting $$C_{10} = |T_e| \quad \text{(Equation 3)}$$

$$C_{20} = 0 \quad \text{(Equation 4)}$$

Conditions regarding state during shifting $$C_1 = C_{10} + \Delta C_1 \quad \text{(Equation 5)}$$

$$C_2 = C_{20} + \Delta C_2 \quad \text{(Equation 6)}$$

Conditions regarding state after shifting $$T_{C1} = C_1 \times \sin(\omega_e - \omega_1) = -C_1 \quad \text{(Equation 7)}$$

$$T_{C2} = C_2 \times \sin(\omega_e - \omega_2) = C \quad \text{(Equation 8)}$$

Equations 9 to 14 shown below can also be derived.
Mathematical Expressions 2
Equation 9 below can be derived from Equations 2, 7, and 8.

$$\dot{\omega}_0 = \frac{-r_1 C_1 + r_2 C_2 - T_0}{r_1^2 I_{C1} + r_2^2 I_{C2}} \quad \text{(Equation 9)}$$

Since the engine braking force existing at the start of shifting is maintained, the following equation can be obtained.
Mathematical Expressions 3

$$-r_1 C_1 + r_2 C_2 = r_1 T_e \quad \text{(Equation 10)}$$

The following equations can be obtained based on Equations 3 to 6.

$$-r_1 \Delta C_1 + r_2 \Delta C_2 = 0 \quad \text{(Equation 11)}$$

$$\Delta C_1 = \frac{r_2}{r_1} \Delta C_2 \quad \text{(Equation 12)}$$

The follow equations can be obtained based on Equation 1)

$$I_e \dot{\omega}_e = \frac{r_2 - r_1}{r_1} \Delta C_2 < 0 \quad \text{(Equation 13)}$$

$$\Delta C_2 = \frac{r_1}{r_2 - r_1} I_e \dot{\omega}_e \quad \text{(Equation 14)}$$

The following equations can be derived for a case in which the transmission is upshifting because it can be assumed that the rotational speed of the post-shift gear is smaller than the rotational speed of the input shaft after shifting.
Mathematical Expressions 4

$$T_{in} = T_{C1} + T_{C2} + I_{in}\dot{\omega}_{in} \quad \text{(Equation 15)}$$

-continued $$T_{C1} = C_1 \times \sin(\omega_{in} - \omega_1) = C_1 \quad \text{(Equation 16)}$$

$$T_{C2} = C_2 \times \sin(\omega_{in} - \omega_2) = C_2 \quad \text{(Equation 17)}$$

$$I_{in}\dot{\omega}_{in} = T_{in} - T_{C1} - T_{C2}$$
$$= T_{in} - C_1 - C_2$$

Equation 18 shown below can then be obtained based on the following.
Mathematical Expressions 5

When $t = t_0, C_{10} = |T_{in}|$ and $C_{20} = 0$

When $t = t_1, C_1 = C_{10} + \Delta C_1$ and $C_2 = C_{20} + \Delta C_2$.

Therefore, $$I_{in}\dot{\omega}_{in} = T_{in} - (|T_{in}| + \Delta C_1) - (C_{20} + \Delta C_2) \quad \text{(Equation 18)}$$

I) When $T_{in} \geq 0$, the equations below can be obtained based on the output shaft torque equation.
Mathematical Expressions 6

$$T_0 = r_1(T_{C1} - I_{C1}\dot{\omega}_1) + r_2(T_{C2} - I_{C2}\dot{\omega}_2) \quad \text{(Equation 2)}$$

Based on the equations $\omega_1 = r_1 \omega_0$, $\omega_2 = r_2 \omega_0$, Equation 16, and Equation 17, the following can be obtained.

$$r_1 C_1 - r_1^2 I_{C1} \dot{\omega}_0 + r_2 C_2 - r_2^2 I_{C2} \dot{\omega}_0 = T_0 \quad \text{(Equation 19)}$$

$$\therefore \dot{\omega}_0 = \frac{r_1 C_1 + r_2 C_2 - T_0}{r_1^2 I_{C1} + r_2^2 I_{C2}}$$

Since the engine braking force that exists at the time $t=t0$ is maintained, the following can be derived.
Mathematical Expressions 7

$$r_1 C_1 + r_2 C_2 = r_1 T_{in}$$

$$r_1(|T_{in}| + \Delta C_1) + r_2(C_{20} + \Delta C_2) = r_1 T_{in}$$

$$r_1 \Delta C_1 + r_2 \Delta C_2 = r_1 T_{in} - r_1 |T_{in}| - r_1 |T_{in}| - r_2 C_{20}$$

Since $T_{in} \geq 0$, if follows that $T_{in} = |T_{in}|$ and the equation can be changed and rearranged as shown below.

$$r_1 \Delta C_1 + r_2 \Delta C_2 = 0 \quad \text{(Equation 20)}$$

$$\therefore \Delta C_1 = -\frac{r_2}{r_1} \Delta C_2$$

Based on Equation 18, the following can be obtained.
Mathematical Expressions 8

$$I_{in}\dot{\omega}_{in} = -\Delta C_1 - \Delta C_2$$

Based on Equation 20, the following can be obtained.

$$I_{in}\dot{\omega}_{in} = \frac{r_2 - r_1}{r_1} \Delta C_2 < 0 \quad \text{(Equation 21)}$$

$$\therefore \Delta C_2 = \frac{r_1}{r_2 - r_1} I_{in}\dot{\omega}_{in}$$

II) When $T_{in} < 0$, then the following can be obtained.
Mathematical Expressions 9
Based on Equation 18, the following can be obtained.

$$I_{in}\dot{\omega}_{in} = 2T_{in} - \Delta C_1 - \Delta C_2 \quad \text{(Equation 22)}$$

The following can be obtained based on the output shaft torque equation.

$$T_0 = r_1(T_{C1} - I_{C1}\dot{\omega}_1) + r_2(T_{C2} - I_{C2}\dot{\omega}_2) \quad \text{(Equation 2)}$$

Based on the equations $\omega_1 = r_1\omega_0$, $\omega_2 = r_2\omega_0$, Equation 16, and Equation 17, the following can be obtained.

$$r_1 C_1 - r_1^2 I_{C1}\dot{\omega}_0 + r_2 C_2 - r_2^2 I_{C2}\dot{\omega}_0 = T_0 \quad \text{(Equation 23)}$$

$$\therefore \dot{\omega}_0 = \frac{r_1 C_1 + r_2 C_2 - T_0}{r_1^2 I_{C1} + r_2^2 I_{C2}}$$

Since the engine braking force that exists at the time $t=t0$ is maintained, the following can be derived.

$$r_1 C_1 + r_2 C_2 = r_1 T_{in}$$

$$r_1(|T_{in}| + \Delta C_1) + r_2(C_{20} + \Delta C_2) = r_1 T_{in}$$

$$r_1 \Delta C_1 + r_2 \Delta C_2 = r_1 T_{in} - r_1 |T_{in}| - r_2 C_{20} \quad \text{(Equation 10)}$$

Since Tin<0, it follows that Tin=−|Tin| and the equation shown below can be obtained.

$$2T_{in} = r_1 \Delta C_1 + r_2 \Delta C_2$$

Substituting this into Equation 22, the following can be derived.

Mathematical Expressions 11

$$I_{in}\dot{\omega}_{in} = r_1 \Delta C_1 + r_2 \Delta C_2 - \Delta C_1 - \Delta C_2 \quad \text{(Equation 24)}$$

$$= (r_1 - 1)\Delta C_1 + (r_2 - 1)\Delta C_2$$

$$= (r_1 - 1)\frac{-r_2}{r_1}\Delta C_2 + (r_2 - 1)\Delta C_2$$

$$= \frac{r_2 - r_1 r_2 + r_1 r_2 - r_1}{r_1}\Delta C_2$$

$$= \frac{r_2 - r_1}{r_1}\Delta C_2 < 0$$

From Equation 24, it is clear that when the input torque Tin is smaller than 0, it is possible to calculate a clutch capacity that will serve to cancel out the inertia torque resulting from the rotational speed change. It is also clear that the control can be executed in the same manner when the vehicle is in a power-on state as when the vehicle is in a power-off state.

Although in the above embodiments the frictional engaging element control section 10 controls the first and second clutches using the input shaft rotational speed as a control parameter, it is also feasible to use the rotational speed of another input member (that correlates to the input shaft) as the control parameter instead of the rotational speed of the input shaft itself. It is also feasible to control the first and second clutches using the gear ratio as the control parameter. Since producing a rotational speed difference between the input and output sides of a clutch changes the apparent gear ratio by a small amount, a target gear ratio can be changed slightly with respect a value in effect before shifting or a value obtained after shifting and the first and second clutches can be controlled such that the gear ratio follows the target gear ratio.

When the gear ratio is used as the control parameter, the target value of the clutch rotation during shifting (equivalent to a control end threshold value) changes from an input rotational speed to a gear ratio (i.e., a target gear ratio).

Regarding the target gear ratio (phase end threshold value) r1 of the preparation phase, the target gear ratio is set to a gear ratio that is higher than a gear ratio in effect before shifting or a gear ratio obtained after shifting by a prescribed amount Δr1 or Δr2 instead of setting a target rotational speed to a rotational speed that is higher than a rotational speed in effect before shifting or a rotational speed obtained after shifting by a prescribed amount Δn1 or Δn2.

When the rotational speed difference of the second clutch or an input rotational speed corresponding to the rotational speed difference of the second clutch (e.g., the input shaft rotational speed) is controlled to a target value, it is acceptable to set the target value in a variable manner instead of setting it to a fixed value. More specifically, as was explained with the time charts of the embodiments, a target value path can be set that defines how the target value will change over time and the control parameter can be controlled to follow the target value path. In this way, the control can be tailored to obtain the desired shift speed and shift duration.

Although the embodiments are explained based on the assumption of the automatic transmission exemplified in FIG. 6, the present invention can be applied broadly to the interchanging (connection state switching) of frictional engaging elements in a variety of automatic transmissions, as explained in principle herein with reference to FIGS. 1 to 5.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An automatic transmission control apparatus for an automatic transmission comprising:
a target value setting section that sets a target rotational speed value for at least one of a first frictional engaging element that is engaged for achieving a low speed gear range before execution of a power-off upshifting and a second frictional engaging element that is engaged for achieving a high speed gear range after the power-off upshifting when the automatic transmission is executing the power-off upshifting, and that sets the target rotational speed value for the first frictional engaging element when in a non-shifting, power-off state before the power-off upshifting is executed;
a total torque capacity calculating section configured to calculate a total torque capacity required of the first and second frictional engaging elements to obtain the target rotational speed value set by the target value setting section;
a distribution ratio setting section that sets a distribution ratio for distributing portions of the total torque capacity between the first and second frictional engaging elements when the automatic transmission is executing the power-off upshifting;
an individual torque capacity calculating section configured to calculate an individual torque capacity for each of the first and second frictional engaging elements based on the total torque capacity calculated by the total torque capacity calculating section and the distribution ratio set by the distribution ratio setting section, the individual torque capacity calculating section executing additively correction of the individual torque capacities of the first and second frictional engaging elements by adding a prescribed torque capacity amount to each of the individual torque capacities when the automatic transmission is in an inertia phase in which a compensation is executed for inertia related to changing from a pre-shift gear ratio to a post-shift gear ratio; and
a connection control section that controls a connection state of each of the first and second frictional engaging elements in accordance with the individual torque capacities calculated by the individual torque capacity calculating section when the power-off upshifting is executed to shift from a pre-shift gear ratio to a post-shift gear ratio.

2. The automatic transmission control apparatus as claimed in claim 1, wherein
the individual torque capacity calculating section is further configured to calculate a derivative value of the target rotational speed value set by the target value setting section, calculates an inertia torque resulting from a change in an input shaft rotational speed by multiplying the derivative value by an input shaft inertia, and to set the calculated inertia torque as the prescribed torque capacity amount, when executing the additive correction.

3. The automatic transmission control apparatus as claimed in claim 1, wherein
the individual torque capacity calculating section is further configured to execute the additive correction during the inertia phase from starting the inertia phase, and to gradually decrease the prescribed torque capacity amount used for the additive correction such that the prescribed torque capacity becomes zero by a time the inertia phase ends.

4. The automatic transmission control apparatus as claimed in claim 1, wherein
the target value setting section is further configured to set the target rotational speed value based on at least one of a quantity corresponding to an engine load, a quantity corresponding to an input rotational speed, and a quantity corresponding to one of the pre-shift gear ratio and the pre-shift gear ratio.

5. The automatic transmission control apparatus as claimed in claim 1, further comprising
a gear establishment control section that controls the automatic transmission by selectively connecting and disconnecting gear sets to selectively achieve the post-shift gear ratio when executing the power-off upshifting in which the gear sets are distributed along first and second transmission input shafts with the first and second frictional engaging elements being arranged to selectively connect and disconnect the first and second transmission input shafts, respectively, from an engine.

6. The automatic transmission control apparatus as claimed in claim 1, wherein
the target value setting section, the total torque capacity calculating section, the distribution ratio setting section, the individual torque capacity calculating section, and the connection control section operatively cooperate to control the first and second frictional engaging elements when executing control of power-off upshifting such that
the power-off upshifting is prepared for in a preparation phase;
a rotational speed of a transmission input shaft supplying torque to the second frictional engaging element is adjusted in the inertia phase;
the first frictional engaging element is changed from a connected state to a released state and the second frictional engaging element is changed from a released state to a connected state in an interchange phase; and
a gear set corresponding to the pre-shift gear ratio in effect before the power-off upshifting is released in an end phase.

7. The automatic transmission control apparatus as claimed in claim 6, wherein
the target value setting section, the total torque capacity calculating section, the distribution ratio setting section, the individual torque capacity calculating section, and the connection control section are configured to operatively cooperate to execute the preparation phase prior to the inertia phase, and to execute the inertia phase prior to the interchange phase.

8. The automatic transmission control apparatus as claimed in claim 6, wherein
the target value setting section is further configured to set the target rotational speed value during the preparation phase, and
the connection control section is further configured to controls the first frictional engaging member during the preparation phase such that an actual rotational speed difference of the first frictional engaging element follows a target rotational speed difference value that is set as the target rotational speed value, and
the distribution ratio setting section is further configured to set the distribution ratio to 1:0, during the preparation phase, such that the total torque capacity is entirely distributed to the first frictional engaging element.

9. The automatic transmission control apparatus as claimed in claim 8, wherein
the target value setting section is further configured to set the target rotational speed value used in the preparation phase based on at least one of a quantity corresponding to an engine load, a quantity corresponding to an input rotational speed of an input member, and a quantity corresponding to one of the pre-shift gear ratio and the post-shift gear ratio.

10. The automatic transmission control apparatus as claimed in claim 7, wherein
the connection control section is further configured to stop using the target rotational speed value used in the preparation phase based on a determination that an input/output rotational speed difference of the first frictional engaging element has been held within a prescribed range for a prescribed amount of time.

11. The automatic transmission control apparatus as claimed in claim 8, further comprising
a gear establishment control section that executes a change in a configuration of a gear set by a mechanical operation other than connection and release of the first and second frictional engaging elements to establish the post-shift gear ratio to be obtained after the power-off upshifting, when in the preparation phase.

12. The automatic transmission control apparatus as claimed in claim 11, wherein
the gear establishment control section is further configured to establish the post-shift gear ratio to be obtained after the power-off upshifting executed in the preparation phase when the torque capacity of the second frictional engaging is determined to be below a minimum torque capacity required to transmit an input torque.

13. The automatic transmission control apparatus as claimed in claim 1, wherein
the connection control section is further configured to control the second frictional engaging element, during the inertia phase, such that the total torque capacity being calculated for controlling an input shaft rotational speed of the second frictional engaging element is changed from an input shaft rotational speed obtainable with the pre-shift gear ratio in effect before the power-off upshifting to an input shaft rotational speed obtainable with the post-shift gear ratio obtained after the power-off upshifting and after entirely distributing the total torque capacity to the second frictional engaging element.

14. The automatic transmission control apparatus as claimed in claim 13, wherein
the target value setting section is further configured to control the target rotational speed value, during the inertia phase, to follow a path of a target rotational speed difference between the input side and an output side of the second frictional engaging element during a period ranging from before shifting to after shifting based on at least one of a quantity corresponding to an engine load, a quantity corresponding to an input shaft rotational speed of the transmission, a quantity corresponding to an input shaft rotational speed of the second frictional engaging element, and a quantity corresponding to one of the pre-shift gear ratio and the pre-shift gear ratio, with the torque capacity of the second frictional engaging element being controlled such that a measured actual rotational speed difference of the second frictional engaging element follows the target rotational speed difference.

15. The automatic transmission control apparatus as claimed in claim 1, wherein
the individual torque capacity calculating section is further configured such that the prescribed torque capacity amount used in the additive correction during the inertia phase is distributed to the first and second frictional engaging elements based on the pre-shift gear ratio in effect before shifting and the post-shift gear ratio obtained after shifting.

16. The automatic transmission control apparatus as claimed in claim 1, wherein
the individual torque capacity calculating section is further configured such that the prescribed torque capacity amount used in the additive correction during the inertia phase is determined based on at least one of a quantity corresponding to an engine load of the engine, a quantity corresponding to an input shaft rotational speed of the transmission, a quantity corresponding to an input shaft rotational speed of one of the first and second frictional engaging elements targeted for control, a quantity corresponding to one of the pre-shift gear ratio and the pre-shift gear ratio, and a quantity corresponding to an input shaft inertia.

17. The automatic transmission control apparatus as claimed in claim 1, wherein
the individual torque capacity calculating section is further configured such that the prescribed torque capacity amount used in the additive correction during the inertia phase is variable according to a shift condition.

18. The automatic transmission control apparatus as claimed in claim 6, wherein
the connection control section is further configured to control the first frictional engaging element, during the interchange phase, such that a rotational speed difference control of the first frictional engaging element is continued while the distribution ratio is transitioned from a ratio 1:0 at which the total torque capacity is entirely distributed to the first frictional engaging element to a ratio of 0:1 at which the total torque capacity is entirely distributed to the second frictional engaging element by gradually decreasing a portion of the distribution ratio corresponding to the first frictional engaging element from 1 to 0 and gradually increasing a portion of the distribution ratio corresponding to the second frictional engaging element from 0 to 1.

19. The automatic transmission control apparatus as claimed in claim 18, wherein
the distribution ratio setting section is further configured to set a change rate of the distribution ratio, during the interchange phase, such that the change rate of the distribution ratio is set to a prescribed value calculated based on at least one of a quantity corresponding to an engine load, a quantity corresponding to an input shaft rotational speed of the transmission, a quantity corresponding to an input shaft rotational speed of one of the first and second frictional engaging elements targeted for control, and a quantity corresponding to one of the pre-shift gear ratio and the post shift gear ratio.

20. The automatic transmission control apparatus as claimed in claim 6, wherein
the target value setting section is further configured to set the target rotational speed value for the second frictional engaging element, during the end phase, and the connection control section controls the second frictional engaging element such that a measured actual rotational speed difference of the second frictional engaging element follows the target rotational speed value.

21. The automatic transmission control apparatus as claimed in claim 20, wherein
the target value setting section is further configured to set the target rotational speed value, during the end phase, based on at least one of a quantity corresponding to an engine load, a quantity corresponding to an input shaft rotational speed of the transmission, a quantity corresponding to an input shaft rotational speed of the second frictional engaging element, and a quantity corresponding to one of the pre-shift gear ratio and the pre-shift gear ratio.

22. The automatic transmission control apparatus as claimed in claim 1, wherein
the target value setting section is further configured to set a target input shaft rotational speed value as the target rotational speed value in which the target input shaft rotational speed value corresponds to an input rotation of the transmission such that the input target rotational speed value is equal to or higher than an output rotational speed of one of the first and second frictional engaging elements targeted for control; and
the total torque capacity calculating section is configured to calculate a total torque capacity required of the first and second frictional engaging elements so that an actual rotational speed of an input member of the transmission becomes equal to the target rotational speed value set by the target value setting section.

23. An automatic transmission control method comprising:
setting a target rotational speed value for one of a first frictional engaging element that is engaged for achieving a low speed gear range before execution of a power-off upshifting and a second frictional engaging element that is engaged for achieving a high speed gear range after the power-off upshifting when the automatic transmission is executing the power-off upshifting, the target rotational speed value being set such that an input shaft rotational speed of the transmission is lower than an output shaft rotational speed of the transmission;
calculating a total torque capacity which is required of the first and second frictional engaging elements to obtain the target rotational speed value that was set;
setting a distribution ratio for distributing portions of the total torque capacity between the first and second frictional engaging elements when the automatic transmission is executing the power-off upshifting;
calculating an individual torque capacity for each of the first and second frictional engaging elements based on the total torque capacity that was calculated and the distribution ratio that was set;
additively correcting the individual torque capacities of the first and second frictional engaging elements by adding a prescribed torque capacity amount to each of the individual torque capacities when the automatic transmission is in an inertia phase in which a compensation is executed for inertia related to changing a gear ratio; and
controlling a connection state of each of the first and second frictional engaging elements in accordance with the individual torque capacities that was calculated.

24. The automatic transmission control method as claimed in claim 23, wherein
the calculating of the individual torque capacities includes calculating a derivative value of the target rotational speed value that was set, calculating an inertia torque resulting from a change in a rotational speed of an input shaft by multiplying the derivative value by an input shaft inertia, and setting the inertia torque that was calculated as the prescribed torque capacity amount to be added.

25. The automatic transmission control method as claimed in claim 23, further comprising
conducting a preparation phase in which the power-off upshifting is prepared for;
adjusting a rotational speed of a transmission input shaft supplying torque to the second frictional engaging element during the inertia phase;
conducting an interchange phase in which the first frictional engaging element is changed from a connected state to a released state and the second frictional engaging element is changed from a released state to a connected state; and
conducting an end phase in which a gear set corresponding to the pre-shift gear ratio in effect before the power-off upshifting is released.

* * * * *